(12) United States Patent
Karimi et al.

(10) Patent No.: US 11,644,351 B2
(45) Date of Patent: May 9, 2023

(54) MULTIPHASE FLOW AND SALINITY METER WITH DUAL OPPOSITE HANDED HELICAL RESONATORS

(71) Applicants: Saudi Arabian Oil Company, Dhahran (SA); King Abdullah University of Science and Technology, Thuwal (SA)

(72) Inventors: Muhammad Akram Karimi, Thuwal (SA); Muhammad Arsalan, Dhahran (SA); Atif Shamim, Thuwal (SA)

(73) Assignees: Saudi Arabian Oil Company, Dhahran (SA); King Abdullah University of Science and Technology, Thurwal (SA)

( * ) Notice: Subject to any disclaimer, the term of this patent is extended or adjusted under 35 U.S.C. 154(b) by 158 days.

(21) Appl. No.: 17/206,741

(22) Filed: Mar. 19, 2021

(65) Prior Publication Data

US 2022/0299348 A1 Sep. 22, 2022

(51) Int. Cl.
*G01F 1/64* (2006.01)
*G01F 1/74* (2006.01)

(52) U.S. Cl.
CPC . *G01F 1/64* (2013.01); *G01F 1/74* (2013.01)

(58) Field of Classification Search
CPC .. G01F 1/64; G01F 1/74; G01F 23/26; G01N 22/00; G01N 33/2823; G01N 33/2847; H01P 7/005; H01P 1/2013; E21B 49/0875
See application file for complete search history.

(56) References Cited

U.S. PATENT DOCUMENTS 335,164 A 2/1886 Vitalis
646,887 A 4/1900 Stowe et al.
(Continued)

FOREIGN PATENT DOCUMENTS

CA 1226325 9/1987
CA 2629578 10/2009
(Continued)

OTHER PUBLICATIONS

An experimental study of on-line measurement of water fraction in gas-oilwater three-phase flow; K.Chen, L. J. Guo* and J. Ye; AIP Conference Proceedings 1428, 128 (2012); https://doi.org/10.1063/1.3694698 Published Online: Mar. 23, 2012 (Year: 2012).*
M. A. Karimi, M. Arsalan and A. Shamim, "Design and Dynamic Characterization of an Orientation Insensitive Microwave Water-Cut Sensor," in IEEE Transactions on Microwave Theory and Techniques, vol. 66, No. 1, pp. 530-539, Jan. 2018, doi: 10.1109/TMTT.2017.2708708. (Year: 2018).*
(Continued)

*Primary Examiner* — Eric S. McCall
*Assistant Examiner* — Timothy P Graves
(74) *Attorney, Agent, or Firm* — Fish & Richardson P.C.

(57) ABSTRACT

A multiphase flow measurement apparatus includes a tubular, a first microwave resonator, a second microwave resonator, and a coplanar waveguide resonator. The tubular includes a wall formed to define an inner bore configured to flow a multiphase fluid. The first microwave resonator has a first helical shape with a first longitudinal length and is configured to generate a first electric field that rotates. The second microwave resonator has a second helical shape with a second longitudinal length different from the first longitudinal length of the first microwave resonator and is configured to generate a second electric field that rotates. The first and second microwave resonators are mutually orthogonal to each other and cooperatively configured to measure a salinity of the multiphase fluid flowing through the inner bore. The coplanar waveguide resonator is configured to generate a third electric field to measure a flow rate of the multiphase fluid.

19 Claims, 8 Drawing Sheets

(56) References Cited

U.S. PATENT DOCUMENTS

| | | |
|---|---|---|
| 1,559,155 A | 10/1925 | Bullock |
| 1,912,452 A | 6/1933 | Hollander |
| 1,978,277 A | 10/1934 | Noble |
| 2,287,027 A | 6/1942 | Cummins |
| 2,556,435 A | 6/1951 | Moehrl |
| 2,625,110 A | 1/1953 | Haentjens et al. |
| 2,641,191 A | 6/1953 | Alfred |
| 2,643,723 A | 6/1953 | Lynes |
| 2,782,720 A | 2/1957 | Dochterman |
| 2,845,869 A | 8/1958 | Herbenar |
| 2,866,417 A | 12/1958 | Otto |
| 2,931,384 A | 4/1960 | Clark |
| 3,007,418 A | 11/1961 | Brundage et al. |
| 3,034,484 A | 5/1962 | Stefancin |
| 3,038,698 A | 6/1962 | Troyer |
| 3,123,010 A | 3/1964 | Witt et al. |
| 3,129,875 A | 4/1964 | Cirillo |
| 3,139,835 A | 7/1964 | Wilkinson |
| 3,171,355 A | 3/1965 | Harris et al. |
| 3,175,403 A | 3/1965 | Nelson |
| 3,175,618 A | 3/1965 | Lang et al. |
| 3,251,226 A | 5/1966 | Cushing |
| 3,272,130 A | 9/1966 | Mosbacher |
| 3,413,925 A | 12/1968 | Campolong |
| 3,448,305 A | 6/1969 | Raynal et al. |
| 3,516,765 A | 6/1970 | Boyadjieff |
| 3,558,936 A | 1/1971 | Horan |
| 3,638,732 A | 2/1972 | Huntsinger et al. |
| 3,663,845 A | 5/1972 | Apstein |
| 3,680,989 A | 8/1972 | Brundage |
| 3,724,503 A | 4/1973 | Cooke |
| 3,771,910 A | 11/1973 | Laing |
| 3,795,145 A | 3/1974 | Miller |
| 3,839,914 A | 10/1974 | Modisette et al. |
| 3,874,812 A | 4/1975 | Hanagarth |
| 3,916,999 A | 11/1975 | Ellis et al. |
| 3,918,520 A | 11/1975 | Hutchison |
| 3,961,758 A | 6/1976 | Morgan |
| 3,970,877 A | 7/1976 | Russell et al. |
| 3,975,117 A | 8/1976 | Carter |
| 4,025,244 A | 5/1977 | Sato |
| 4,096,211 A | 6/1978 | Rameau |
| 4,139,330 A | 2/1979 | Neal |
| 4,154,302 A | 5/1979 | Cugini |
| 4,181,175 A | 1/1980 | McGee et al. |
| 4,226,275 A | 10/1980 | Frosch |
| 4,266,607 A | 5/1981 | Halstead |
| 4,289,199 A | 9/1981 | McGee |
| 4,336,415 A | 6/1982 | Walling |
| 4,374,530 A | 2/1983 | Walling |
| 4,387,318 A | 6/1983 | Kolm et al. |
| 4,387,685 A | 6/1983 | Abbey |
| 4,417,474 A | 11/1983 | Elderton |
| 4,425,965 A | 1/1984 | Bayh, III et al. |
| 4,440,221 A | 4/1984 | Taylor et al. |
| 4,476,923 A | 10/1984 | Walling |
| 4,491,176 A | 1/1985 | Reed |
| 4,497,185 A | 2/1985 | Shaw |
| 4,536,674 A | 8/1985 | Schmidt |
| 4,576,043 A | 3/1986 | Nguyen |
| 4,580,634 A | 4/1986 | Cruise |
| 4,582,131 A | 4/1986 | Plummer et al. |
| 4,586,854 A | 5/1986 | Newman et al. |
| 4,619,323 A | 10/1986 | Gidley |
| 4,627,489 A | 12/1986 | Reed |
| 4,632,187 A | 12/1986 | Bayh, III et al. |
| 4,658,583 A | 4/1987 | Shropshire |
| 4,662,437 A | 5/1987 | Renfro |
| 4,665,981 A | 5/1987 | Hayatdavoudi |
| 4,685,523 A | 8/1987 | Paschal, Jr. et al. |
| 4,741,668 A | 5/1988 | Bearden et al. |
| 4,757,709 A | 7/1988 | Czernichow |
| RE32,866 E | 2/1989 | Cruise |
| 4,838,758 A | 6/1989 | Sheth |
| 4,850,812 A | 7/1989 | Voight |
| 4,856,344 A | 8/1989 | Hunt |
| 4,867,633 A | 9/1989 | Gravelle |
| 4,969,364 A | 11/1990 | Masuda |
| 4,986,739 A | 1/1991 | Child |
| 5,033,937 A | 7/1991 | Wilson |
| 5,094,294 A | 3/1992 | Bayh, III et al. |
| 5,113,379 A | 5/1992 | Scherbatskoy |
| 5,150,619 A | 9/1992 | Turner |
| 5,158,440 A | 10/1992 | Cooper et al. |
| 5,169,286 A | 12/1992 | Yamada |
| 5,180,014 A | 1/1993 | Cox |
| 5,195,882 A | 3/1993 | Freeman |
| 5,201,848 A | 4/1993 | Powers |
| 5,209,650 A | 5/1993 | Lemieux |
| 5,224,182 A | 6/1993 | Murphy et al. |
| 5,261,796 A | 11/1993 | Niemiec et al. |
| 5,269,377 A | 12/1993 | Martin |
| 5,285,008 A | 2/1994 | Sas-Jaworsky et al. |
| 5,301,760 A | 4/1994 | Graham |
| 5,317,223 A | 5/1994 | Kiesewetter et al. |
| 5,323,661 A | 6/1994 | Cheng |
| 5,334,801 A | 8/1994 | Mohn |
| 5,335,542 A | 8/1994 | Ramakrishnan et al. |
| 5,337,603 A | 8/1994 | McFarland et al. |
| 5,358,378 A | 10/1994 | Holscher |
| 5,375,622 A | 12/1994 | Houston |
| 5,482,117 A | 1/1996 | Kolpak |
| 5,494,413 A | 2/1996 | Campen et al. |
| 5,566,762 A | 10/1996 | Braddick et al. |
| 5,591,922 A | 1/1997 | Segeral et al. |
| 5,605,193 A | 2/1997 | Bearden et al. |
| 5,613,311 A | 3/1997 | Burtch |
| 5,613,555 A | 3/1997 | Sorem et al. |
| 5,620,048 A | 4/1997 | Beauquin |
| 5,641,915 A | 6/1997 | Ortiz |
| 5,649,811 A | 7/1997 | Krol, Jr. et al. |
| 5,653,585 A | 8/1997 | Fresco et al. |
| 5,693,891 A | 12/1997 | Brown |
| 5,708,500 A | 1/1998 | Anderson |
| 5,736,650 A | 4/1998 | Hiron et al. |
| 5,755,288 A | 5/1998 | Bearden et al. |
| 5,834,659 A | 11/1998 | Ortiz |
| 5,845,709 A | 12/1998 | Mack et al. |
| 5,848,642 A | 12/1998 | Sola |
| 5,880,378 A | 3/1999 | Behring |
| 5,886,267 A | 3/1999 | Ortiz et al. |
| 5,892,860 A | 4/1999 | Maron et al. |
| 5,905,208 A | 5/1999 | Ortiz et al. |
| 5,908,049 A | 6/1999 | Williams et al. |
| 5,921,285 A | 7/1999 | Quigley et al. |
| 5,954,305 A | 9/1999 | Calabro |
| 5,965,964 A | 10/1999 | Skinner et al. |
| 5,975,205 A | 11/1999 | Carisella |
| 6,044,906 A | 4/2000 | Saltel |
| 6,068,015 A | 5/2000 | Pringle |
| 6,082,455 A | 7/2000 | Pringle et al. |
| 6,113,675 A | 9/2000 | Branstetter |
| 6,129,507 A | 10/2000 | Ganelin |
| 6,148,866 A | 11/2000 | Quigley et al. |
| 6,155,102 A | 12/2000 | Toma |
| 6,164,308 A | 12/2000 | Butler |
| 6,167,965 B1 | 1/2001 | Bearden et al. |
| 6,176,323 B1 | 1/2001 | Weirich |
| 6,179,269 B1 | 1/2001 | Kobylinski et al. |
| 6,192,983 B1 | 2/2001 | Neuroth et al. |
| 6,193,079 B1 | 2/2001 | Weimer |
| 6,209,652 B1 | 4/2001 | Portman et al. |
| 6,257,332 B1 | 7/2001 | Vidrine et al. |
| 6,264,440 B1 | 7/2001 | Klein et al. |
| 6,285,446 B1 | 9/2001 | Farhadiroushan et al. |
| 6,286,558 B1 | 9/2001 | Quigley et al. |
| 6,289,990 B1 | 9/2001 | Dillon et al. |
| 6,298,917 B1 | 10/2001 | Kobylinski et al. |
| 6,325,143 B1 | 12/2001 | Scarsdale |
| 6,357,485 B2 | 3/2002 | Quigley et al. |
| 6,361,272 B1 | 3/2002 | Bassett |
| 6,413,065 B1 | 7/2002 | Dass |
| 6,414,239 B1 | 7/2002 | Gasque, Jr. |
| 6,427,778 B1 | 8/2002 | Beall et al. |

(56) References Cited

U.S. PATENT DOCUMENTS

| | | |
|---|---|---|
| 6,454,010 B1 | 9/2002 | Thomas et al. |
| 6,463,810 B1 | 10/2002 | Liu |
| 6,504,258 B2 | 1/2003 | Schultz et al. |
| 6,530,211 B2 | 3/2003 | Holtzapple et al. |
| 6,544,013 B2 | 4/2003 | Kato et al. |
| 6,546,812 B2 | 4/2003 | Lewis |
| 6,547,519 B2 | 4/2003 | deBlanc et al. |
| 6,550,327 B1 | 4/2003 | Van Berk |
| 6,557,642 B2 | 5/2003 | Head |
| 6,578,638 B2 | 6/2003 | Guillory et al. |
| 6,588,266 B2 | 7/2003 | Tubel et al. |
| 6,601,460 B1 | 8/2003 | Matema |
| 6,601,651 B2 | 8/2003 | Grant |
| 6,604,550 B2 | 8/2003 | Quigley et al. |
| 6,629,564 B1 | 10/2003 | Ramakrishnan et al. |
| 6,655,221 B1 | 12/2003 | Aspelund et al. |
| 6,679,692 B1 | 1/2004 | Feuling et al. |
| 6,681,894 B1 | 1/2004 | Fanguy |
| 6,726,449 B2 | 4/2004 | James et al. |
| 6,728,165 B1 | 4/2004 | Roscigno et al. |
| 6,733,249 B2 | 5/2004 | Maier et al. |
| 6,741,000 B2 | 5/2004 | Newcomb |
| 6,755,609 B2 | 6/2004 | Preinfalk |
| 6,768,214 B2 | 7/2004 | Schultz et al. |
| 6,776,054 B1 | 8/2004 | Stephenson |
| 6,779,601 B2 | 8/2004 | Wilson |
| 6,807,857 B2 | 10/2004 | Storm, Jr. |
| 6,808,371 B2 | 10/2004 | Niwatsukino et al. |
| 6,811,382 B2 | 11/2004 | Buchanan et al. |
| 6,848,539 B2 | 2/2005 | Lee et al. |
| 6,856,132 B2 | 2/2005 | Appel et al. |
| 6,857,452 B2 | 2/2005 | Quigley et al. |
| 6,857,920 B2 | 2/2005 | Marathe et al. |
| 6,863,137 B2 | 3/2005 | Terry et al. |
| 6,913,079 B2 | 7/2005 | Tubel |
| 6,915,707 B2 | 7/2005 | Nyfors et al. |
| 6,920,085 B2 | 7/2005 | Finke et al. |
| 6,935,189 B2 | 8/2005 | Richards |
| 6,993,979 B2 | 2/2006 | Segeral |
| 7,017,681 B2 | 3/2006 | Ivannikov et al. |
| 7,021,905 B2 | 4/2006 | Torrey et al. |
| 7,032,662 B2 | 4/2006 | Malone et al. |
| 7,086,294 B2 | 8/2006 | DeLong |
| 7,093,665 B2 | 8/2006 | Dass |
| 7,107,860 B2 | 9/2006 | Jones |
| 7,199,480 B2 | 4/2007 | Fripp et al. |
| 7,224,077 B2 | 5/2007 | Allen |
| 7,226,279 B2 | 6/2007 | Andoskin et al. |
| 7,242,103 B2 | 7/2007 | Tips |
| 7,249,805 B2 | 7/2007 | Cap |
| 7,259,688 B2 | 8/2007 | Hirsch et al. |
| 7,262,532 B2 | 8/2007 | Seidler et al. |
| 7,275,592 B2 | 10/2007 | Davis |
| 7,275,711 B1 | 10/2007 | Flanigan |
| 7,293,471 B2 | 11/2007 | Bo et al. |
| 7,338,262 B2 | 3/2008 | Gozdawa |
| 7,345,372 B2 | 3/2008 | Roberts et al. |
| 7,377,312 B2 | 5/2008 | Davis |
| 7,410,003 B2 | 8/2008 | Ravensbergen et al. |
| 7,647,948 B2 | 1/2010 | Quigley et al. |
| 7,668,411 B2 | 2/2010 | Davies et al. |
| 7,670,122 B2 | 3/2010 | Phillips et al. |
| 7,670,451 B2 | 3/2010 | Head |
| 7,699,099 B2 | 4/2010 | Bolding et al. |
| 7,730,937 B2 | 6/2010 | Head |
| 7,762,715 B2 | 7/2010 | Gordon et al. |
| 7,770,469 B2 | 8/2010 | Nyfors et al. |
| 7,770,650 B2 | 8/2010 | Young et al. |
| 7,775,763 B1 | 8/2010 | Johnson et al. |
| 7,819,640 B2 | 10/2010 | Kalavsky et al. |
| 7,841,395 B2 | 11/2010 | Gay et al. |
| 7,841,826 B1 | 11/2010 | Phillips |
| 7,847,421 B2 | 12/2010 | Gardner et al. |
| 7,849,928 B2 | 12/2010 | Collie |
| 7,905,295 B2 | 3/2011 | Mack |
| 7,906,861 B2 | 3/2011 | Guerrero et al. |
| 7,946,341 B2 | 5/2011 | Hartog et al. |
| 8,013,660 B2 | 9/2011 | Fitzi |
| 8,016,545 B2 | 9/2011 | Oklejas et al. |
| 8,047,232 B2 | 11/2011 | Bernitsas |
| 8,066,033 B2 | 11/2011 | Quigley et al. |
| 8,067,865 B2 | 11/2011 | Savant |
| 8,197,602 B2 | 6/2012 | Baron |
| 8,235,126 B2 | 8/2012 | Bradley |
| 8,258,644 B2 | 9/2012 | Kaplan |
| 8,261,841 B2 | 9/2012 | Bailey et al. |
| 8,302,736 B1 | 11/2012 | Olivier |
| 8,337,142 B2 | 12/2012 | Eslinger et al. |
| 8,408,064 B2 | 4/2013 | Hartog et al. |
| 8,419,398 B2 | 4/2013 | Kothnur et al. |
| 8,421,251 B2 | 4/2013 | Pabon et al. |
| 8,426,988 B2 | 4/2013 | Hay |
| 8,493,556 B2 | 7/2013 | Li et al. |
| 8,506,257 B2 | 8/2013 | Bottome |
| 8,564,179 B2 | 10/2013 | Ochoa et al. |
| 8,568,081 B2 | 10/2013 | Song et al. |
| 8,570,050 B2 | 10/2013 | Nyfors et al. |
| 8,579,617 B2 | 11/2013 | Ono et al. |
| 8,604,634 B2 | 12/2013 | Pabon et al. |
| 8,638,002 B2 | 1/2014 | Lu |
| 8,648,480 B1 | 2/2014 | Liu et al. |
| 8,771,499 B2 | 7/2014 | McCutchen et al. |
| 8,786,113 B2 | 7/2014 | Tinnen et al. |
| 8,821,138 B2 | 9/2014 | Holtzapple et al. |
| 8,905,728 B2 | 12/2014 | Blankemeier et al. |
| 8,916,983 B2 | 12/2014 | Marya et al. |
| 8,925,649 B1 | 1/2015 | Wiebe et al. |
| 8,936,430 B2 | 1/2015 | Bassett |
| 8,948,550 B2 | 2/2015 | Li et al. |
| 8,950,476 B2 | 2/2015 | Head |
| 8,960,309 B2 | 2/2015 | Davis |
| 8,973,433 B2 | 3/2015 | Mulford |
| 9,080,336 B1 | 7/2015 | Yantis |
| 9,091,144 B2 | 7/2015 | Swanson et al. |
| 9,106,159 B1 | 8/2015 | Wiebe et al. |
| 9,109,429 B2 | 8/2015 | Xu et al. |
| 9,130,161 B2 | 9/2015 | Nair et al. |
| 9,133,709 B2 | 9/2015 | Huh et al. |
| 9,140,815 B2 | 9/2015 | Lopez et al. |
| 9,157,297 B2 | 10/2015 | Williamson, Jr. |
| 9,170,149 B2 | 10/2015 | Hartog et al. |
| 9,200,932 B2 | 12/2015 | Sittier |
| 9,203,277 B2 | 12/2015 | Kori et al. |
| 9,234,529 B2 | 1/2016 | Meuter |
| 9,239,043 B1 | 1/2016 | Zeas |
| 9,321,222 B2 | 4/2016 | Childers et al. |
| 9,322,389 B2 | 4/2016 | Tosi |
| 9,353,614 B2 | 5/2016 | Roth et al. |
| 9,383,476 B2 | 7/2016 | Trehan |
| 9,499,460 B2 | 11/2016 | Kawamura et al. |
| 9,500,073 B2 | 11/2016 | Alan et al. |
| 9,540,908 B1 | 1/2017 | Olivier |
| 9,574,438 B2 | 2/2017 | Flores |
| 9,581,489 B2 | 2/2017 | Skinner |
| 9,587,456 B2 | 3/2017 | Roth |
| 9,593,561 B2 | 3/2017 | Xiao et al. |
| 9,599,460 B2 | 3/2017 | Wang et al. |
| 9,599,505 B2 | 3/2017 | Lagakos et al. |
| 9,617,847 B2 | 4/2017 | Jaaskelainen et al. |
| 9,631,482 B2 | 4/2017 | Roth et al. |
| 9,677,560 B1 | 6/2017 | Davis et al. |
| 9,757,796 B2 | 9/2017 | Sherman et al. |
| 9,759,025 B2 | 9/2017 | Vavik |
| 9,759,041 B2 | 9/2017 | Osborne |
| 9,784,077 B2 | 10/2017 | Gorrara |
| 9,880,096 B2 | 1/2018 | Bond et al. |
| 9,903,010 B2 | 2/2018 | Doud et al. |
| 9,915,134 B2 | 3/2018 | Xiao et al. |
| 9,932,806 B2 | 4/2018 | Stewart |
| 9,951,598 B2 | 4/2018 | Roth et al. |
| 9,964,533 B2 | 5/2018 | Ahmad |
| 9,976,381 B2 | 5/2018 | Martin et al. |
| 9,982,519 B2 | 5/2018 | Melo |
| 10,100,596 B2 | 10/2018 | Roth et al. |

(56) References Cited

U.S. PATENT DOCUMENTS

| | | |
|---|---|---|
| 10,115,942 B2 | 10/2018 | Qiao et al. |
| 10,138,885 B2 | 11/2018 | Ejim et al. |
| 10,151,194 B2 | 12/2018 | Roth et al. |
| 10,209,383 B2 | 2/2019 | Barfoot et al. |
| 10,253,610 B2 | 4/2019 | Roth et al. |
| 10,273,399 B2 | 4/2019 | Cox et al. |
| 10,287,853 B2 | 5/2019 | Ejim et al. |
| 10,308,865 B2 | 6/2019 | Cox et al. |
| 10,323,644 B1 | 6/2019 | Shakirov et al. |
| 10,337,302 B2 | 7/2019 | Roth et al. |
| 10,337,312 B2 | 7/2019 | Xiao et al. |
| 10,352,125 B2 | 7/2019 | Frazier |
| 10,367,434 B2 | 7/2019 | Ahmad |
| 10,378,322 B2 | 8/2019 | Ejim et al. |
| 10,465,477 B2 | 11/2019 | Abdelaziz et al. |
| 10,465,484 B2 | 11/2019 | Turner et al. |
| 10,487,259 B2 | 11/2019 | Cox et al. |
| 10,501,682 B2 | 12/2019 | Cox et al. |
| 10,533,558 B2 | 1/2020 | Melo et al. |
| 10,578,111 B2 | 3/2020 | Xiao et al. |
| 10,634,553 B1 | 4/2020 | Hveding et al. |
| 10,934,814 B2 | 3/2021 | Arsalan et al. |
| 2001/0036334 A1 | 11/2001 | Choa |
| 2002/0043404 A1 | 4/2002 | Trueman et al. |
| 2002/0074742 A1 | 6/2002 | Quoiani |
| 2002/0079100 A1 | 6/2002 | Simpson |
| 2002/0109080 A1 | 8/2002 | Tubel et al. |
| 2002/0121376 A1 | 9/2002 | Rivas |
| 2002/0153141 A1 | 10/2002 | Hartman |
| 2003/0079880 A1 | 5/2003 | Deaton et al. |
| 2003/0141071 A1 | 7/2003 | Hosie |
| 2003/0161739 A1 | 8/2003 | Chu et al. |
| 2003/0185676 A1 | 10/2003 | James |
| 2003/0226395 A1 | 12/2003 | Storm et al. |
| 2004/0060705 A1 | 4/2004 | Kelley |
| 2005/0047779 A1 | 3/2005 | Jaynes et al. |
| 2005/0098349 A1 | 5/2005 | Krueger et al. |
| 2005/0166961 A1 | 8/2005 | Means |
| 2005/0217859 A1 | 10/2005 | Hartman |
| 2006/0076956 A1 | 4/2006 | Sjolie et al. |
| 2006/0086498 A1 | 4/2006 | Wetzel et al. |
| 2006/0096760 A1 | 5/2006 | Ohmer |
| 2007/0012437 A1 | 1/2007 | Clingman et al. |
| 2007/0181304 A1 | 8/2007 | Rankin et al. |
| 2007/0193749 A1 | 8/2007 | Folk |
| 2008/0048455 A1 | 2/2008 | Carney |
| 2008/0093084 A1 | 4/2008 | Knight |
| 2008/0100828 A1 | 5/2008 | Cyr et al. |
| 2008/0187434 A1 | 8/2008 | Neiszer |
| 2008/0236842 A1 | 10/2008 | Bhavsar et al. |
| 2008/0262737 A1 | 10/2008 | Thigpen et al. |
| 2008/0264182 A1 | 10/2008 | Jones |
| 2008/0277941 A1 | 11/2008 | Bowles |
| 2008/0290876 A1 | 11/2008 | Ameen |
| 2008/0292454 A1 | 11/2008 | Brunner |
| 2008/0296067 A1 | 12/2008 | Haughom |
| 2009/0001304 A1 | 1/2009 | Hansen et al. |
| 2009/0016899 A1 | 1/2009 | Davis |
| 2009/0090513 A1 | 4/2009 | Bissonnette |
| 2009/0107725 A1 | 4/2009 | Christy et al. |
| 2009/0110579 A1 | 4/2009 | Amburgey |
| 2009/0151928 A1 | 6/2009 | Lawson |
| 2009/0151953 A1 | 6/2009 | Brown |
| 2009/0166045 A1 | 7/2009 | Wetzel et al. |
| 2009/0255669 A1 | 10/2009 | Ayan et al. |
| 2009/0304322 A1 | 10/2009 | Davies et al. |
| 2009/0289627 A1 | 11/2009 | Johansen et al. |
| 2009/0293634 A1 | 12/2009 | Ong |
| 2010/0040492 A1 | 2/2010 | Eslinger et al. |
| 2010/0122818 A1 | 5/2010 | Rooks |
| 2010/0164231 A1 | 7/2010 | Tsou |
| 2010/0206420 A1 | 8/2010 | Jakobsen |
| 2010/0206577 A1 | 8/2010 | Martinez |
| 2010/0236794 A1 | 9/2010 | Duan |
| 2010/0244404 A1 | 9/2010 | Bradley |
| 2010/0258306 A1 | 10/2010 | Camilleri |
| 2010/0288493 A1 | 11/2010 | Fielder et al. |
| 2010/0300413 A1 | 12/2010 | Ulrey et al. |
| 2010/0308592 A1 | 12/2010 | Frayne |
| 2011/0017459 A1 | 1/2011 | Dinkins |
| 2011/0024107 A1 | 2/2011 | Sunyovszky et al. |
| 2011/0024231 A1 | 2/2011 | Wurth et al. |
| 2011/0036568 A1 | 2/2011 | Barbosa |
| 2011/0036662 A1 | 2/2011 | Smith |
| 2011/0049901 A1 | 3/2011 | Tinnen |
| 2011/0088462 A1 | 4/2011 | Samson et al. |
| 2011/0155390 A1 | 6/2011 | Lannom et al. |
| 2011/0162832 A1 | 7/2011 | Reid |
| 2011/0185805 A1 | 8/2011 | Roux et al. |
| 2011/0203848 A1 | 8/2011 | Krueger et al. |
| 2011/0259120 A1 | 10/2011 | Thonstad |
| 2011/0273032 A1 | 11/2011 | Lu |
| 2011/0278094 A1 | 11/2011 | Gute |
| 2011/0296911 A1 | 12/2011 | Moore |
| 2011/0300008 A1 | 12/2011 | Fielder et al. |
| 2012/0012327 A1 | 1/2012 | Plunkett et al. |
| 2012/0018143 A1 | 1/2012 | Lembcke |
| 2012/0060615 A1 | 3/2012 | Farhadiroushan et al. |
| 2012/0211245 A1 | 8/2012 | Fuhst et al. |
| 2012/0282119 A1 | 11/2012 | Floyd |
| 2012/0292915 A1 | 11/2012 | Moon |
| 2013/0019673 A1 | 1/2013 | Sroka |
| 2013/0300833 A1 | 1/2013 | Perkins |
| 2013/0048302 A1 | 2/2013 | Gokdag et al. |
| 2013/0051977 A1 | 2/2013 | Song |
| 2013/0066139 A1 | 3/2013 | Wiessler |
| 2013/0068454 A1 | 3/2013 | Armistead |
| 2013/0068481 A1 | 3/2013 | Zhou |
| 2013/0073208 A1 | 3/2013 | Dorovsky |
| 2013/0081460 A1 | 4/2013 | Xiao et al. |
| 2013/0091942 A1 | 4/2013 | Samson et al. |
| 2013/0119669 A1 | 5/2013 | Murphree |
| 2013/0167628 A1 | 7/2013 | Hull et al. |
| 2013/0175030 A1 | 7/2013 | Ige |
| 2013/0189123 A1 | 7/2013 | Stokley |
| 2013/0200628 A1 | 8/2013 | Kane |
| 2013/0213663 A1 | 8/2013 | Lau et al. |
| 2013/0227940 A1 | 9/2013 | Greenblatt |
| 2013/0248429 A1 | 9/2013 | Dahule |
| 2013/0255370 A1 | 10/2013 | Roux et al. |
| 2013/0259721 A1 | 10/2013 | Noui-Mehidi |
| 2014/0012507 A1 | 1/2014 | Trehan |
| 2014/0014331 A1 | 1/2014 | Crocker |
| 2014/0027546 A1 | 1/2014 | Kean et al. |
| 2014/0037422 A1 | 2/2014 | Gilarranz |
| 2014/0041862 A1 | 2/2014 | Ersoz |
| 2014/0076547 A1 | 3/2014 | Unalmis et al. |
| 2014/0116720 A1 | 5/2014 | He et al. |
| 2014/0144706 A1 | 5/2014 | Bailey et al. |
| 2014/0167418 A1 | 6/2014 | Hiejima |
| 2014/0175800 A1 | 6/2014 | Thorp |
| 2014/0208855 A1 | 7/2014 | Skinner |
| 2014/0209291 A1 | 7/2014 | Watson et al. |
| 2014/0265337 A1 | 9/2014 | Harding et al. |
| 2014/0284937 A1 | 9/2014 | Dudley et al. |
| 2014/0311737 A1 | 10/2014 | Bedouet et al. |
| 2014/0341714 A1 | 11/2014 | Casa |
| 2014/0343857 A1 | 11/2014 | Pfutzner |
| 2014/0377080 A1 | 12/2014 | Xiao et al. |
| 2015/0034580 A1 | 2/2015 | Nakao et al. |
| 2015/0060083 A1 | 3/2015 | Romer et al. |
| 2015/0068769 A1 | 3/2015 | Xiao et al. |
| 2015/0071795 A1 | 3/2015 | Vazquez et al. |
| 2015/0114127 A1 | 4/2015 | Barfoot et al. |
| 2015/0192141 A1 | 7/2015 | Nowitzki et al. |
| 2015/0233228 A1 | 8/2015 | Roth |
| 2015/0308245 A1 | 10/2015 | Stewart et al. |
| 2015/0308444 A1 | 10/2015 | Trottman |
| 2015/0318920 A1 | 11/2015 | Johnston |
| 2015/0330194 A1 | 11/2015 | June et al. |
| 2015/0354308 A1 | 12/2015 | June et al. |
| 2015/0354590 A1 | 12/2015 | Kao |
| 2015/0376907 A1 | 12/2015 | Nguyen |
| 2016/0010451 A1 | 1/2016 | Melo |

(56) References Cited

U.S. PATENT DOCUMENTS

| | | |
|---|---|---|
| 2016/0016834 A1 | 1/2016 | Dahule |
| 2016/0168957 A1 | 6/2016 | Tubel |
| 2016/0169231 A1 | 6/2016 | Michelassi et al. |
| 2016/0177659 A1 | 6/2016 | Voll et al. |
| 2016/0273947 A1 | 9/2016 | Mu et al. |
| 2016/0305447 A1 | 10/2016 | Dreiss et al. |
| 2016/0332856 A1 | 11/2016 | Steedley |
| 2017/0033713 A1 | 2/2017 | Petroni |
| 2017/0038246 A1 | 2/2017 | Coates et al. |
| 2017/0058664 A1 | 3/2017 | Xiao et al. |
| 2017/0074082 A1 | 3/2017 | Palmer |
| 2017/0075029 A1 | 3/2017 | Cuny et al. |
| 2017/0122046 A1 | 5/2017 | Vavik |
| 2017/0138189 A1 | 5/2017 | Ahmad et al. |
| 2017/0159668 A1 | 6/2017 | Nowitzki et al. |
| 2017/0167498 A1 | 6/2017 | Chang |
| 2017/0175752 A1 | 6/2017 | Hofer et al. |
| 2017/0183942 A1 | 6/2017 | Veland |
| 2017/0194831 A1 | 7/2017 | Marvel |
| 2017/0235006 A1 | 8/2017 | Ellmauthaler et al. |
| 2017/0260846 A1 | 9/2017 | Jin et al. |
| 2017/0292533 A1 | 10/2017 | Zia |
| 2017/0321695 A1 | 11/2017 | Head |
| 2017/0328151 A1 | 11/2017 | Dillard |
| 2018/0011033 A1 | 1/2018 | Karimi et al. |
| 2018/0045543 A1 | 2/2018 | Farhadiroushan et al. |
| 2018/0052041 A1 | 2/2018 | Yaman et al. |
| 2018/0058157 A1 | 3/2018 | Melo et al. |
| 2018/0066671 A1 | 3/2018 | Murugan et al. |
| 2018/0128661 A1 | 5/2018 | Munro |
| 2018/0134036 A1 | 5/2018 | Galtarossa et al. |
| 2018/0155991 A1 | 6/2018 | Arsalan et al. |
| 2018/0171763 A1 | 6/2018 | Malbrel et al. |
| 2018/0171767 A1 | 6/2018 | Huynh et al. |
| 2018/0172020 A1 | 6/2018 | Ejim |
| 2018/0202843 A1 | 7/2018 | Artuso et al. |
| 2018/0226174 A1 | 8/2018 | Rose |
| 2018/0238152 A1 | 8/2018 | Melo |
| 2018/0274311 A1 | 9/2018 | Zsolt |
| 2018/0284304 A1 | 10/2018 | Barfoot et al. |
| 2018/0306199 A1 | 10/2018 | Reed |
| 2018/0320059 A1 | 11/2018 | Cox et al. |
| 2018/0340389 A1 | 11/2018 | Wang |
| 2018/0351480 A1 | 12/2018 | Ahmad |
| 2018/0363660 A1 | 12/2018 | Klahn |
| 2019/0025095 A1 | 1/2019 | Steel |
| 2019/0032667 A1 | 1/2019 | Ifrim et al. |
| 2019/0040863 A1 | 2/2019 | Davis et al. |
| 2019/0049054 A1 | 2/2019 | Gunnarsson |
| 2019/0055792 A1 | 2/2019 | Sui et al. |
| 2019/0072379 A1 | 3/2019 | Jalilian et al. |
| 2019/0128113 A1 | 5/2019 | Ross et al. |
| 2019/0253003 A1 | 8/2019 | Ahmad |
| 2019/0253004 A1 | 8/2019 | Ahmad |
| 2019/0253005 A1 | 8/2019 | Ahmad |
| 2019/0253006 A1 | 8/2019 | Ahmad |
| 2019/0271217 A1 | 9/2019 | Radov et al. |
| 2019/0368291 A1 | 12/2019 | Xiao et al. |
| 2019/0376371 A1 | 12/2019 | Arsalan |
| 2020/0018149 A1 | 1/2020 | Luo et al. |
| 2020/0056462 A1 | 2/2020 | Xiao et al. |
| 2020/0056615 A1 | 2/2020 | Xiao et al. |

FOREIGN PATENT DOCUMENTS

| | | |
|---|---|---|
| CN | 2168104 | 6/1994 |
| CN | 1507531 | 6/2004 |
| CN | 101328769 | 12/2008 |
| CN | 101592475 | 12/2009 |
| CN | 201496028 | 6/2010 |
| CN | 101842547 | 9/2010 |
| CN | 102471701 | 5/2012 |
| CN | 101488805 | 8/2012 |
| CN | 202851445 | 4/2013 |
| CN | 103185025 | 7/2013 |
| CN | 203420906 | 2/2014 |
| CN | 103913186 | 7/2014 |
| CN | 104141633 | 11/2014 |
| CN | 104533797 | 4/2015 |
| CN | 105043586 | 11/2015 |
| CN | 103835988 | 1/2016 |
| CN | 105239963 | 1/2016 |
| CN | 103717901 | 6/2016 |
| CN | 106895959 | 6/2017 |
| CN | 107144339 | 9/2017 |
| CN | 206496768 | 9/2017 |
| CN | 105371943 | 6/2018 |
| CN | 107664541 | 6/2018 |
| CN | 108534910 | 9/2018 |
| DE | 2260678 | 6/1974 |
| DE | 3022241 | 12/1981 |
| DE | 3444859 | 6/1985 |
| DE | 3520884 | 1/1986 |
| DE | 19654092 | 7/1998 |
| DE | 10307887 | 10/2004 |
| DE | 102007005426 | 5/2008 |
| DE | 102008001607 | 11/2009 |
| DE | 102008054766 | 6/2010 |
| DE | 202012103729 | 10/2012 |
| DE | 102012215023 | 1/2014 |
| DE | 102012022453 | 5/2014 |
| DE | 102013200450 | 7/2014 |
| DE | 102012205757 | 8/2014 |
| EP | 0380148 | 8/1990 |
| EP | 0510774 | 10/1992 |
| EP | 0579981 | 1/1994 |
| EP | 0637675 | 2/1995 |
| EP | 1101024 | 5/2001 |
| EP | 1143104 | 10/2001 |
| EP | 1270900 | 1/2003 |
| EP | 1369588 | 12/2003 |
| EP | 2801696 | 12/2014 |
| EP | 2893301 | 5/2018 |
| EP | 3527830 | 8/2019 |
| GB | 670206 | 4/1952 |
| GB | 2173034 | 10/1986 |
| GB | 2218721 | 11/1989 |
| GB | 2226776 | 7/1990 |
| GB | 2283035 | 4/1995 |
| GB | 2313445 | 11/1997 |
| GB | 2348674 | 10/2000 |
| GB | 2477909 | 8/2011 |
| GB | 2504104 | 1/2014 |
| JP | 4019375 | 1/1992 |
| JP | 2005076486 | 3/2005 |
| JP | 2010156172 | 7/2010 |
| JP | 2013110910 | 6/2013 |
| RU | 98500 | 10/2010 |
| RU | 122531 | 11/2012 |
| RU | 178531 | 4/2018 |
| WO | WO 1993006331 | 4/1993 |
| WO | WO 1995004869 | 2/1995 |
| WO | WO 1998046857 | 10/1998 |
| WO | WO 1999027256 | 6/1999 |
| WO | WO 2002072998 | 9/2002 |
| WO | WO 2005066502 | 7/2005 |
| WO | WO 2009046709 | 4/2009 |
| WO | WO 2009113894 | 9/2009 |
| WO | WO 2009129607 | 10/2009 |
| WO | WO 2011066050 | 6/2011 |
| WO | WO 2011101296 | 8/2011 |
| WO | WO 2011133620 | 10/2011 |
| WO | WO 2011135541 | 11/2011 |
| WO | WO 2012058290 | 5/2012 |
| WO | WO 2012166638 | 12/2012 |
| WO | WO 2013089746 | 6/2013 |
| WO | WO 2013171053 | 11/2013 |
| WO | WO 2014116458 | 7/2014 |
| WO | WO 2014127035 | 8/2014 |
| WO | WO 2014147645 | 9/2014 |
| WO | WO 2015034482 | 3/2015 |
| WO | WO 2015041655 | 3/2015 |
| WO | WO 2015073018 | 5/2015 |
| WO | WO 2015084926 | 6/2015 |

(56) References Cited

FOREIGN PATENT DOCUMENTS

| | | |
|---|---|---|
| WO | WO 2015123236 | 8/2015 |
| WO | WO 2016003662 | 1/2016 |
| WO | WO 2016012245 | 1/2016 |
| WO | WO 2016050301 | 4/2016 |
| WO | WO 2016081389 | 5/2016 |
| WO | WO 2016089526 | 6/2016 |
| WO | WO 2016111849 | 7/2016 |
| WO | WO 2016130620 | 8/2016 |
| WO | WO 2016160016 | 10/2016 |
| WO | WO 2016195643 | 12/2016 |
| WO | WO 2017021553 | 2/2017 |
| WO | WO 2017146593 | 8/2017 |
| WO | WO 2018022198 | 2/2018 |
| WO | WO 2018096345 | 5/2018 |
| WO | WO 2018125071 | 7/2018 |
| WO | WO 2018145215 | 8/2018 |
| WO | WO 2019243789 | 12/2019 |

OTHER PUBLICATIONS

Demori, Marco, et al. "A capacitive sensor system for the analysis of two-phase flows of oil and conductive water." Sensors and Actuators A: Physical 163.1 (2010): 172-179. (Year: 2010).*

Liu, Xingbin, et al. "Conductance sensor for measurement of the fluid watercut and flowrate in production wells." AIP Conference Proceedings. vol. 914. No. 1. American Institute of Physics, 2007. (Year: 2007).*

Abelsson et al., "Development and Testing of a Hybrid Boosting Pump," OTC 21516, Offshore Technology Conference, presented at the Offshore Technology Conference, May 2-5, 2011, 9 pages.

Alhanati et al., "ESP Failures: Can we talk the same language?" SPE paper, SPE ESP Workshop held in Houston, Apr. 25-27, 2001, 11 page.

Alhasan et al., "Extending mature field production life using a multiphase twin screw pump," BHR Group Multiphase 15, 2011, 11 pages.

Baker Hughes, "Multiphase Pump: Increases Efficiency and Production in Wells with High Gast Content," Brochure overview, retrieved from URL <https://assets.www.bakerhughes.com/system/69/00d970d9dd11e3a411ddf3c1325ea6/28592.MVP_Overview.pdf>, 2014, 2 pages.

Bao et al., "Recent development in the distributed fiber optic acoustic and ultrasonic detection," Journal of Lightwave Technology 35:16, Aug. 15, 2017, 12 pages.

Blunt, "Effects of heterogeneity and wetting on relative permeability using pore level modeling," SPE 36762, Society of Petroleum Engineers (SPE), SPE Journal 2:01 (70-87), Mar. 1997, 19 pages.

Bryant and Blunt, "Prediction of relative permeability in simple porous media," Physical Review A 46:4, Aug. 1992, 8 pages.

Bybee et al., "Through-Tubing Completions Maximize Production," SPE-0206-0057, Society of Petroleum Engineers (SPE), Drilling and Cementing Technology, JPT, Feb. 2006, 2 pages.

Champion et al., "The application of high-power sound waves for wellbore cleaning," SPE 82197, Society of Petroleum Engineers International (SPE), presented at the SPE European Formation Damage Conference, May 13-14, 2003, 10 pages.

Chappell and Lancaster, "Comparison of methodological uncertainties within permeability measurements," Wiley InterScience, Hydrological Processes, Jan. 2007, 21(18):2504-2514.

Chen et al., "Distributed acoustic sensor based on two-mode fiber," Optics Express, Sep. 2018, 26(19), 9 pages.

Corona et al., "Novel Washpipe-Free ICD Completion With Dissolvable Material," OTC-28863-MS, Offshore Technology Conference (OTC), presented at the Offshore Technology Conference, Apr. 30-May 3, 2018, 10 pages.

Cox et al., "Realistic Assessment of Proppant Pack Conductivity for Material Section," SPE-84306-MS, Society of Petroleum Engineers (SPE), presented at the SPE Annual Technical Conference and Exhibition, Oct. 5-8, 2003, 12 pages.

Cramer et al., "Development and Application of a Downhole Chemical Injection Pump for Use in ESP Applications," SPE 14403, Society of Petroleum Engineers (SPE), presented at the 66th Annual Technical Conference and Exhibition, Sep. 22-25, 1985, 6 page.

Danfoss, "Facts Worth Knowing about Frequency Converters," Handbook VLT Frequency Converters, Danfoss Engineering Tomorrow, 180 pages.

Demori et al., "A capacitive sensor system for the analysis of two-phase flows of oil and conductive water," Sensors and Actuators A: Physical, 2010, 163(1):172-179, 8 pages.

DiCarlo et al., "Three-phase relative permeability of water-wet, oil-wet, and mixed-wet sandpacks," SPE 60767, Society of Petroleum Engineers (SPE), presented at the 1998 SPE Annual Technical Conference and Exhibition, Sep. 27-30, 1998, SPE Journal 5(1):82-91, Mar. 2000, 10 pages.

Dixit et al., "A pore-level investigation of relative permeability hysteresis in water-wet systems," SPE 37233, Society of Petroleum Engineers (SPE), presented at the 1997 SPE International Symposium on Oilfield Chemistiy, Feb. 18-21, 1997, SPE Journal 3(2):115-123, Jun. 1998, 9 pages.

ejprescott.com [online], "Water, Sewer and Drain Fittings B-22, Flange Adaptors," retrieved from URL <https://www.ejprescott.com/media/reference/FlangeAdaptorsB-22.pdf> retrieved on Jun. 15, 2020, available on or before Nov. 2010 via wayback machine URL <http://web.archive.org/web/20101128181255/https://www.ejprescott.com/media/reference/FlangeAdaptorsB-22.pdf>, 5 pages.

Fatt, "The network model of porous media," SPE 574-G, I. Capillary Pressure Characteristics, AIME Petroleum Transactions, Dec. 1956, 207:144-181, 38 pages.

Fornarelli et al., "Flow patterns and heat transfer around six in-line circular cylinders at low Reynolds number," JP Journal of Heat and Mass Transfer, Pushpa Publishing House, Allahabad, India, Feb. 2015, 11(1):1-28, 28 pages.

Gadani et al., "Effect of salinity on the dielectric properties of water," Indian Journal of Pure & Applied Physics, Jun. 2012, 50:405-410, 6 pages.

Geary et al., "Downhole Pressure Boosting in Natural Gas Wells: Results from Prototype Testing," SPE 11406, Society of Petroleum Engineers International (SPE), presented at the SPE Asia Pacific Oil and Gas Conference and Exhibition, Oct. 20-22, 2008, 13 pages.

Gillard et al., "A New Approach to Generating Fracture Conductivity," SPE-135034-MS, Society of Petroleum Engineers (SPE), presented at the SPE Annual Technical Conference and Exhibition, Sep. 20-22, 2010, 14 pages.

Godbole et al., "Axial Thrust in Centrifugal Pumps—Experimental Analysis," Paper Ref: 2977, presented at the 15th International Conference on Experimental Mechanics, ICEM15, Jul. 22-27, 2012, 14 pages.

Gomaa et al., "Computational Fluid Dynamics Applied to Investigate Development and Optimization of Highly Conductive Channels within the Fracture Geometry," SPE-179143-MS, Society of Petroleum Engineers (SPE), SPE Production & Operations, 32:04, Nov. 2017, 12 pages.

Gomaa et al., "Improving Fracture Conductivity by Developing and Optimizing a Channels Within the Fracture Geometry: CFD Study," SPE-178982-MS, Society of Petroleum Engineers (SPE), presented at the SPE International Conference and Exhibition on Formation Damage Control, Feb. 24-26, 2016, 25 pages.

Govardhan et al., "Critical mass in vortex-induced vibration of a cylinder," European Journal of Mechanics B/Fluids, Jan.-Feb. 2004, 23(1):47-27, 11 pages.

Gryphon Oilfield Solutions, "Echo Dissolvable Fracturing Plug," EchoSeries, Dissolvable Fracturing Plugs, Aug. 2018, 1 page.

Harstad et al., "Field Performance Evaluation of a Non-Radioactive MPFM in Challenging Conditions in the Middle East," 35th International North Sea Flow Measurement Workshop, Oct. 24-26, 2017, 19 pages.

Heiba et al., "Percolation theory of two-phase relative permeability," SPE Reservoir Engineering, Feb. 1992, 7(1):123-132, 11 pages.

Hua et al., "Comparison of Multiphase Pumping Techniques for Subsea and Downhole Applications," SPE 146784, Society of Petroleum Engineers International (SPE), presented at the SPE Annual Technical Conference and Exhibition, Oct. 30-Nov. 2, 2011, Oil and Gas Facilities, Feb. 2012, 11 pages.

(56) References Cited

OTHER PUBLICATIONS

Hui and Blunt, "Effects of wettability on three-phase flow in porous media" American Chemical Society (ACS), J. Phys. Chem., Feb. 2000, 104(16):3833-3845, 13 pages.

Juarez and Taylor, "Field test of a distributed fiber-optic intrusion sensor system for long perimeters," Applied Optics, Apr. 2007, 46(11), 4 pages.

Karimi et al., "Design and Dynamic Characterization of an Orientation Insensitive Microwave Water-Cut Sensor," IEEE Transactions on Microwave Theory and Techniques, Jan. 2018, 66(1):530-539, 10 pages.

Keiser, "Optical fiber communications," 26-57, McGraw Hill, 2008, 16 pages.

Kern et al., "Propping Fractures With Aluminum Particles," SPE-1573-G-PA, Society of Petroleum Engineers (SPE), Journal of Per, Technology, Jun. 1961, 13(6):583-589, 7 pages.

Krag et al., "Preventing Scale Deposition Downhole Using High Frequency Electromagnetic AC Signals from Surface Enhance Production Offshore Denmark," SPE-170898-MS, Society of Petroleum Engineers International (SPE), presented at the SPE Annual Technical Conference and Exhibition, Oct. 27-29, 2014, 10 pages.

laserfocusworld.com [online], "High-Power Lasers: Fiber lasers drill for oil," Dec. 5, 2012, retrieved on May 31, 2018, retrieved from URL: <https://www.laserfocusworld.com/articles/print/volume48/issue-12/world-news/high-power-lasers-fiber-lasers-drill-for-oil.html>, 4 pages.

Li et al., "In Situ Estimation of Relative Permeability from Resistivity Measurements," EAGE/The Geological Society of London, Petroleum Geoscience, 2014, 20:143-151, 10 pages.

machinedesign.com [online], Frances Richards, "Motors for efficiency: Permanent-magnet, reluctance, and induction motors compared," Apr. 2013, retrieved on Nov. 11, 2020, retrieved from URL <https://www.machinedesign.com/motors-drives/article/21832406/motors-for-efficiency-permanentmagnet-reluctance-and-induction-motors-compared>.

Mahmud et al., "Effect of network topology on two-phase imbibition relative permeability," Transport in Porous Media, Feb. 2007, 66(3):481-493, 14 pages.

Meyer et al., "Theoretical Foundation and Design Formulae for Channel and Pillar Type Propped Fractures—A Method to Increase Fracture Conductivity," SPE-170781-MS, Society of Petroleum Engineers (SPE), presented at the SPE Annual Technical Conference and Exhibition, Oct. 27-29, 2014, 25 pages.

Mirza, "The Next Generation of Progressive Cavity Multiphase Pumps use a Novel Design Concept for Superior Performance and Wet Gas Compression," Flow Loop Testing, BHR Group, 2007, 9 pages.

Mirza, "Three Generations of Multiphase Progressive Cavity Pumping," Cahaba Media Group, Upstream Pumping Solutions, Winter 2012, 6 pages.

Muswar et al., "Physical Water Treatment in the Oil Field Results from Indonesia," SPE 113526, Society of Petroleum Engineers International (SPE), presented at the SPE Asia Pacific Oil and Gas Conference and Exhibition, Oct. 18-20, 2010, 11 pages.

Nagy et al., "Comparison of permeability testing methods," Proceedings of the 18th International Conference on Soil Mechanics and Geotechnical Engineering, 2013, 399-402, 4 pages.

Palisch et al., "Determining Realistic Fracture Conductivity and Understanding its Impact on Well Performance-Theory and Field Examples," SPE-106301-MS, Society of Petroleum Engineers (SPE), presented at the 2007 SPE Hydraulic Fracturing Technology Conference, Jan. 29-31, 2007, 13 pages.

Parker, "About Gerotors," Parker Haffinfin Corp, 2008, 2 pages.

Poollen et al., "Hydraulic Fracturing—FractureFlow Capacity vs Well Productivity," SPE-890-G, Society of Petroleum Engineers (SPE), presented at 32nd Annual Fall Meeting of Society of Petroleum Engineers, Oct. 6-9, 1957, published as Petroleum Transactions AIME 213, 1958, 5 pages.

Poollen, "Productivity vs Permeability Damage in Hydraulically Produced Fractures," Paper 906-2-G, American Petroleum Institute, presented at Drilling and Production Practice, Jan. 1, 1957, 8 pages.

Purcell, "Capillary pressures—their measurement using mercury and the calculation of permeability therefrom," Petroleum Transactions, AIME, presented at the Branch Fall Meeting, Oct. 4-6, 1948, Journal of Petroleum Technology, Feb. 1949, 1(2):39-48, 10 pages.

Qin et al., "Signal-to-Noise Ratio Enhancement Based on Empirical Mode Decomposition in Phase-Sensitive Optical Time Domain Reflectometry Systems," Sensors, MDPI, 17:1870, Aug. 14, 2017, 10 pages.

Rzeznik et al., "Two Year Results of a Breakthrough Physical Water Treating System for the Control of Scale in Oilfield Applications," SPE114072, Society of Petroleum Engineers International (SPE), presented at the 2008 SPE International Oilfield Scale Conference, May 28-29, 2008, 11 pages.

Schlumberger, "AGH: Advanced Gas-Handling Device," Product Sheet, retrieved from URL: <http://www.slb.com/~/media/Files/artificial_lift/product_sheets/ESPs/advanced_gas_handling_ps.pdf>, Jan. 2014, 2 pages.

Schöneberg, "Wet Gas Compression with Twin Screw Pumps," Bornemann Pumps, Calgary Pump Symposium 2005, 50 pages.

Simpson et al., "A Touch, Truly Multiphase Downhole Pump for Unconventional Wells," SPE-185152-MS, Society of Petroleum Engineers (SPE), presented at the SPE Electric Submersible Pump Symposium, the Woodlands, Texas, Apr. 24-28, 2017, 20 pages.

Sulzer Technical Review, "Pushing the Boundaries of Centrifugal Pump Design," Oil and Gas, Jan. 2014, 2 pages.

Takahashi et al., "Degradation Study on Materials for Dissolvable Frac Plugs," URTEC-2901283-MS, Unconventional Resources Technology Conference (URTC), presented at the SPE/AAPG/SEG Unconventional Resources Technology Conference, Jul. 23-25, 2018, 9 pages.

Terves, "TervAlloy Degradable Magnesium Alloys," Terves Engineered Response, Engineered for Enhanced Completion Efficiency, Feb. 2018, 8 pages.

Tinsley and Williams, "A new method for providing increased fracture conductivity and improving stimulation results," SPE-4676-PA, Society of Petroleum Engineers (SPE), Journal of Petroleum Technology, Nov. 1975, 27(11), 7 pages.

tm4.com [online], "Outer rotor for greater performance," available on or before Dec. 5, 2017, via internet archive: Wayback Machine URL <https://web.archive.org/web/20171205163856/https://www.tm4.com/technology/electric-motors/external-rotor-motor-technology/>, retrieved on May 17, 2017, retrieved from URL <https://www.tm4.com/technology/electric-motors/external-rotor-motor-technology/>, 2 pages.

Vincent, "Examining Our Assumptions—Have Oversimplifications Jeopardized our Ability to Design Optimal Fracture Treatments," SPE-119143-MS, Society of Petroleum Engineers (SPE), presented at the 2009 SPE Hydraulic Fracturing Technology Conference, Jan. 19-21, 2009, 51 pages.

Vincent, "Five Things You Didn't Want to Know about Hydraulic Fractures," ISRM-ICHF-2013-045, presented at the International Conference for Effective and Sustainable Hydraulic Fracturing: An ISRM specialized Conference, May 20-22, 2013, 14 pages.

Vysloukh, "Chapter 8: Stimulated Raman Scattering," Nonlinear Fiber Optics, 1990, 298-302, 5 pages.

Walker et al., "Proppants, We Don't Need No Proppants—A Perspective of Several Operators," SPE-38611-MS, Society of Petroleum Engineers (SPE), presented at the 1997 Annual Technical Conference and Exhibition, Oct. 5-8, 1997, 8 pages.

Wang et al., "Rayleigh scattering in few-mode optical fibers," Scientific reports, Oct. 2016, 6:35844, 8 pages.

Wylde et al., "Deep Downhole Chemical Injection on BP-Operated Miller: Experience and Learning," SPE 92832, Society of Petroleum Engineers (SPE), presented at the 2005 SPE International Symposium on Oilfield Chemistry, May 11-12, 2005, SPE Production & Operations, May 2006, 6 pages.

Xiao et al., "Induction Versus Permanent Magnet Motors for ESP Applications," SPE-192177-MS, Society of Petroleum Engineers

(56) References Cited

OTHER PUBLICATIONS (SPE), presented at the SPE Kingdom of Saudi Arabia Annual Technical Symposium and Exhibition, Apr. 23-26, 2018, 15 pages.
Yamate et al., "Optical Sensors for the Exploration of Oil and Gas," Journal of Lightwave Technology, Aug. 2017, 35(16), 8 pages.
Yu et al., "Borehole seismic survey using multimode optical fibers in a hybrid wireline," Measurement, Sep. 2018, 125:694-703, 10 pages.
Zhan et al., "Characterization of Reservoir Heterogeneity Through Fluid Movement Monitoring with Deep Electromagnetic and Pressme Measurements," SPE 116328, Society of Petroleum Engineers International (SPE), presented at the 2008 SPE Annual Technical Conference and Exhibition, Sep. 21-24, 2008, 16 pages.

\* cited by examiner

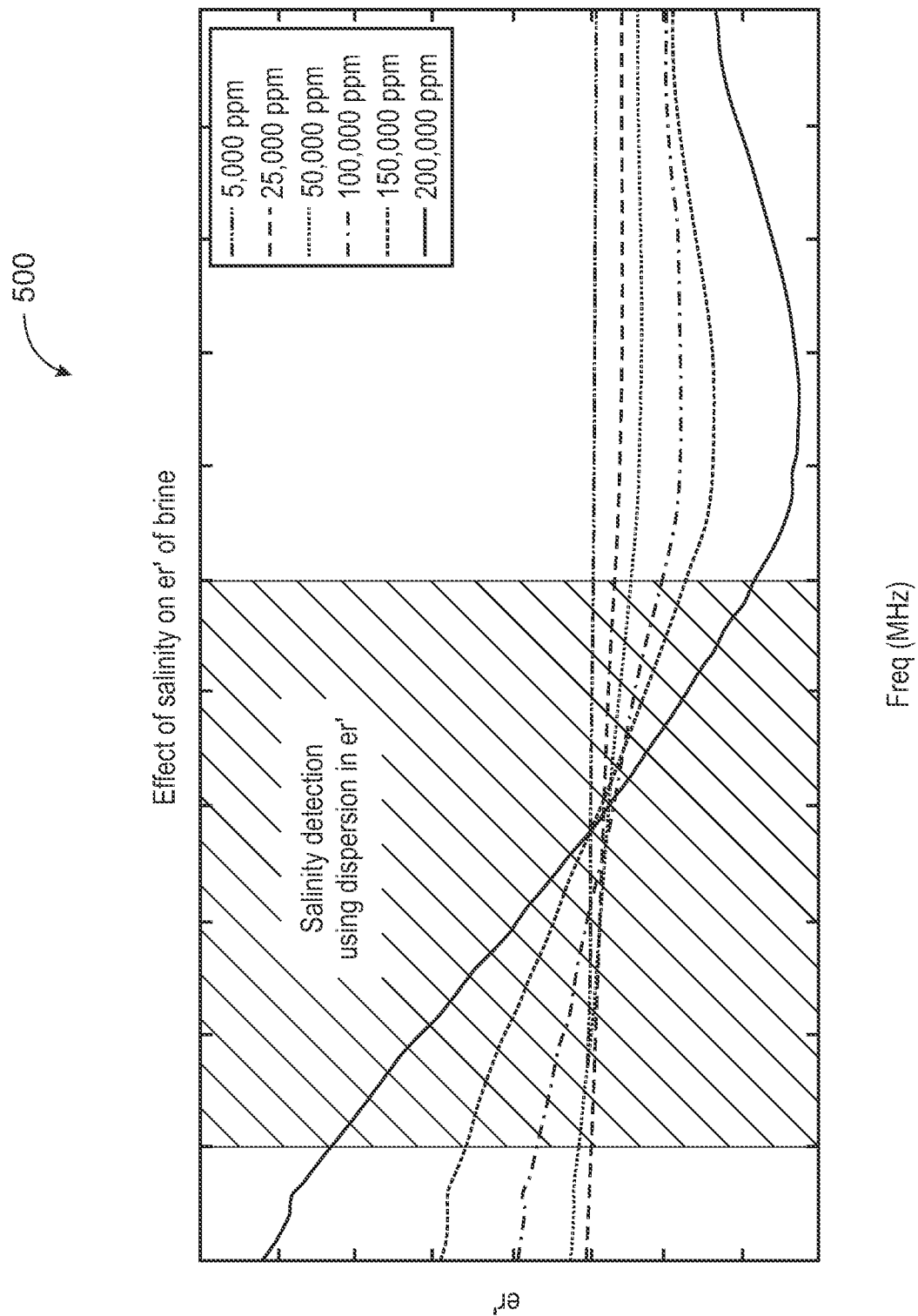

MULTIPHASE FLOW AND SALINITY METER WITH DUAL OPPOSITE HANDED HELICAL RESONATORS

TECHNICAL FIELD

This disclosure relates to multiphase flow measurement.

BACKGROUND

Production fluid typically comes from wells in the form of a complex mixture of three phases (oil, water, and gas) that are co-mingled together. In some cases, a small quantity of solids (such as sand particles) may also be present in the production fluid. Knowledge of the individual flow rates of the various phases of the production fluid from a producing well can help to facilitate reservoir management, field development, operational control, flow assurance, and production allocation.

SUMMARY

This disclosure describes technologies relating to multiphase flow measurement. Certain aspects of the subject matter described can be implemented as a multiphase flow measurement apparatus. The apparatus includes a tubular, a first microwave resonator, a second microwave resonator, and a coplanar waveguide resonator. The tubular includes a wall formed to define an inner bore configured to flow a multiphase fluid. The first microwave resonator is disposed on an outer circumferential surface of the wall. The first microwave resonator has a first helical shape with a first longitudinal length. The first microwave resonator is configured to generate a first electric field that rotates in the inner bore along the first helical shape of the first microwave resonator. The second microwave resonator is disposed on the outer circumferential surface of the wall. The second microwave resonator has a second helical shape with a second longitudinal length different from the first longitudinal length of the first microwave resonator. The second microwave resonator is configured to generate a second electric field that rotates in the inner bore along the second helical shape of the second microwave resonator. The first and second microwave resonators are mutually orthogonal to each other and cooperatively configured to measure a salinity of the multiphase fluid flowing through the inner bore. The coplanar waveguide resonator is disposed on the outer circumferential surface of the wall. The coplanar waveguide resonator is configured to generate a third electric field to measure a flow rate of the multiphase fluid flowing through the inner bore.

This, and other aspects, can include one or more of the following features.

In some implementations, the coplanar waveguide resonator is a first coplanar waveguide resonator. In some implementations, the apparatus includes a second coplanar waveguide resonator disposed on the outer circumferential surface of the wall. In some implementations, the second coplanar waveguide resonator is configured to generate a fourth electric field. In some implementations, the first and second coplanar waveguide resonators are cooperatively configured to measure the flow rate and a dielectric loss of the multiphase fluid flowing through the inner bore.

In some implementations, the first and second microwave resonators are disposed on the outer circumferential surface of the wall between the first and second coplanar waveguide resonators.

In some implementations, the apparatus includes a Venturi tube including a convergent section having a cross-sectional area that is smaller than a cross-sectional area of the inner bore. In some implementations, an outlet of the Venturi tube is coupled to an inlet of the tubular. In some implementations, the apparatus includes a differential pressure sensor fluidically coupled to the Venturi tube upstream and downstream of the convergent section. In some implementations, the differential pressure sensor is configured to measure a pressure drop of the multiphase fluid through the convergent section. In some implementations, the first coplanar waveguide resonator, the second coplanar waveguide resonator, and the differential pressure sensor are cooperatively configured to measure the flow rate of the multiphase fluid flowing through the inner bore. In some implementations, the apparatus includes a temperature sensor coupled to the tubular. In some implementations, the temperature sensor is configured to measure a temperature of the multiphase fluid. In some implementations, the first coplanar waveguide resonator, the second coplanar waveguide resonator, the differential pressure sensor, and the temperature sensor are cooperatively configured to measure the flow rate and the salinity of the multiphase fluid flowing through the inner bore.

In some implementations, the first microwave resonator is configured to generate the first electric field, such that the first electric field makes at least a 360 degree rotation in the inner bore along the first helical shape of the first microwave resonator. In some implementations, the second microwave resonator is configured to generate the second electric field, such that the second electric field makes at least a 360 degree rotation in the inner bore along the second helical shape of the second microwave resonator.

Certain aspects of the subject matter described can be implemented as a multiphase flow measurement apparatus. The apparatus includes a tubular, a first microwave resonator, a second microwave resonator, and a coplanar waveguide resonator. The first microwave resonator is disposed on an exterior of the apparatus. The first microwave resonator has a first helical shape with a first longitudinal length and is configured to generate a first electric field that rotates around the exterior of the apparatus along the first helical shape of the first microwave resonator. The second microwave resonator is disposed on the exterior of the apparatus. The second microwave resonator has a second helical shape with a second longitudinal length different from the first longitudinal length of the first microwave resonator. The second microwave resonator is configured to generate a second electric field that rotates around the exterior of the apparatus along the second helical shape of the second microwave resonator. The first and second microwave resonators are mutually orthogonal to each other and cooperatively configured to measure a salinity of a multiphase fluid flowing across the exterior of the apparatus. The coplanar waveguide resonator is disposed on an exterior of the tubular. The coplanar waveguide resonator is configured to generate a third electric field to measure a flow rate of the multiphase fluid flowing across the exterior of the tubular.

This, and other aspects, can include one or more of the following features.

In some implementations, the first and second microwave resonators are disposed on and wrap around the exterior of the tubular.

In some implementations, the coplanar waveguide resonator is a first coplanar waveguide resonator. In some implementations, the apparatus includes a second coplanar waveguide resonator disposed on the exterior of the tubular and configured to generate a fourth electric field. In some implementations, the first and second coplanar waveguide resonators are cooperatively configured to measure the flow rate and a dielectric loss of the multiphase fluid flowing across the exterior of the apparatus. In some implementations, the first and second microwave resonators are disposed on the exterior of the tubular between the first and second coplanar waveguide resonators.

In some implementations, the apparatus includes a first conical end and a second conical end, wherein the first conical end and the second conical end are coupled to the tubular at opposite ends of the tubular. In some implementations, the first microwave resonator is disposed on and wraps around an exterior of the first conical end. In some implementations, the second microwave resonator is disposed on and wraps around an exterior of the second conical end. In some implementations, the first microwave resonator is configured to generate the first electric field, such that the first electric field makes at least a 360 degree rotation around the first conical end along the first helical shape of the first microwave resonator. In some implementations, the second microwave resonator is configured to generate the second electric field, such that the second electric field makes at least a 360 degree rotation around the second conical end along the second helical shape of the second microwave resonator.

Certain aspects of the subject matter described can be implemented as a method. A multiphase fluid is flowed to contact an apparatus. The apparatus includes a tubular, a first microwave resonator, a second microwave resonator, and a coplanar waveguide resonator. The first microwave resonator has a first helical shape with a first longitudinal length. The second microwave resonator has a second helical shape with a second longitudinal length. The first and second microwave resonators are mutually orthogonal to each other. The coplanar waveguide resonator is disposed on an exterior of the tubular. A first electric field is generated by the first microwave resonator. The first electric field rotates along the first helical shape of the first microwave resonator. A second electric field is generated by the second microwave resonator. The second electric field that rotates along the second helical shape of the second microwave resonator. A third electric field is generated by the coplanar waveguide resonator. A fluid characteristic of the multiphase fluid is determined in response to generating the first, second, and third electric fields. The fluid characteristics includes at least one of flow rate, salinity, or phase fraction.

This, and other aspects, can include one or more of the following features.

In some implementations, the first electric field makes at least a 360 degree rotation along the first helical shape of the first microwave resonator. In some implementations, the second electric field makes at least a 360 degree rotation along the second helical shape of the second microwave resonator.

In some implementations, the apparatus includes a first conical end and a second conical end. In some implementations, the first and second conical ends are coupled to the tubular at opposite ends of the tubular. In some implementations, the first microwave resonator is disposed on and wraps around an exterior of the first conical end. In some implementations, the second microwave resonator is disposed on and wraps around an exterior of the second conical end.

In some implementations, the first and second microwave resonators are disposed on the exterior of the tubular. In some implementations, flowing the multiphase fluid to contact the apparatus includes flowing the multiphase fluid through an inner bore of the tubular.

In some implementations, the method includes generating a fourth electric field by a second coplanar waveguide resonator. In some implementations, the method includes determining a dielectric loss of the multiphase fluid in response to generating the third and fourth electric fields.

The details of one or more implementations of the subject matter of this disclosure are set forth in the accompanying drawings and the description. Other features, aspects, and advantages of the subject matter will become apparent from the description, the drawings, and the claims.

DESCRIPTION OF DRAWINGS

FIG. 5A is a plot showing the effect of salinity on the dielectric constant of brines.

DETAILED DESCRIPTION

This disclosure describes multiphase flow measurement. A multiphase flow measurement apparatus includes a microwave resonator and a coplanar waveguide resonator. Both the microwave resonator and the coplanar waveguide resonator can be printed on an exterior surface of a non-metallic material. The apparatus can include multiple microwave resonators with different longitudinal lengths, such that the microwave resonators have different resonant frequencies. The apparatus can include multiple coplanar waveguide resonators. The microwave resonator(s) and the coplanar waveguide resonator(s) generate electric fields and are cooperatively configured to determine properties of a multiphase fluid. In some cases, the multiphase fluid flows through an inner bore of the apparatus. In some cases, the multiphase fluid flows across an exterior of the apparatus. In some cases, data from the microwave resonator(s) and coplanar waveguide resonator(s) are correlated with process data, such as pressure and/or temperature of the multiphase fluid.

The subject matter described in this disclosure can be implemented in particular implementations, so as to realize one or more of the following advantages. The apparatuses and methods described utilize electric fields having frequencies in the microwave spectrum, which can be safer in comparison to measurements that utilize radioactive sources to measure multiphase flow. The apparatuses described are compact in size, which can be useful in space-restricted environments. For example, the apparatuses can be implemented for multiphase fluid flow measurement in pipes having a diameter of 4 inches or larger. The apparatuses and methods described can be implemented to determine properties of a multiphase fluid without requiring mixing of the multiphase fluid prior to measurement. The apparatuses described are not sensitive to orientation and can be easily installed to existing equipment. In some implementations, the apparatus is non-intrusive and does not introduce any obstruction to the flow area of the multiphase fluid. The apparatuses and methods described implement helical T-resonator whose resonant frequency can be adjusted by increasing or decreasing a length of the resonator, for example, by adjusting the manner in which the resonator is printed on a surface of the apparatus. By allowing for ease of resonant frequency adjustment, the apparatuses and methods described can be implemented to measure dielectric properties at different frequencies to form a basis for multiphase flow measurements, such as water-cut ratio and gas volume fraction. In some cases, the resonant frequency of the printed helical T-resonator can be easily adjusted even after fabrication. In contrast, such post-fabrication adjustments to resonant frequency can be difficult for conventional resonators, such as cavity type resonators.

Figure 1A:
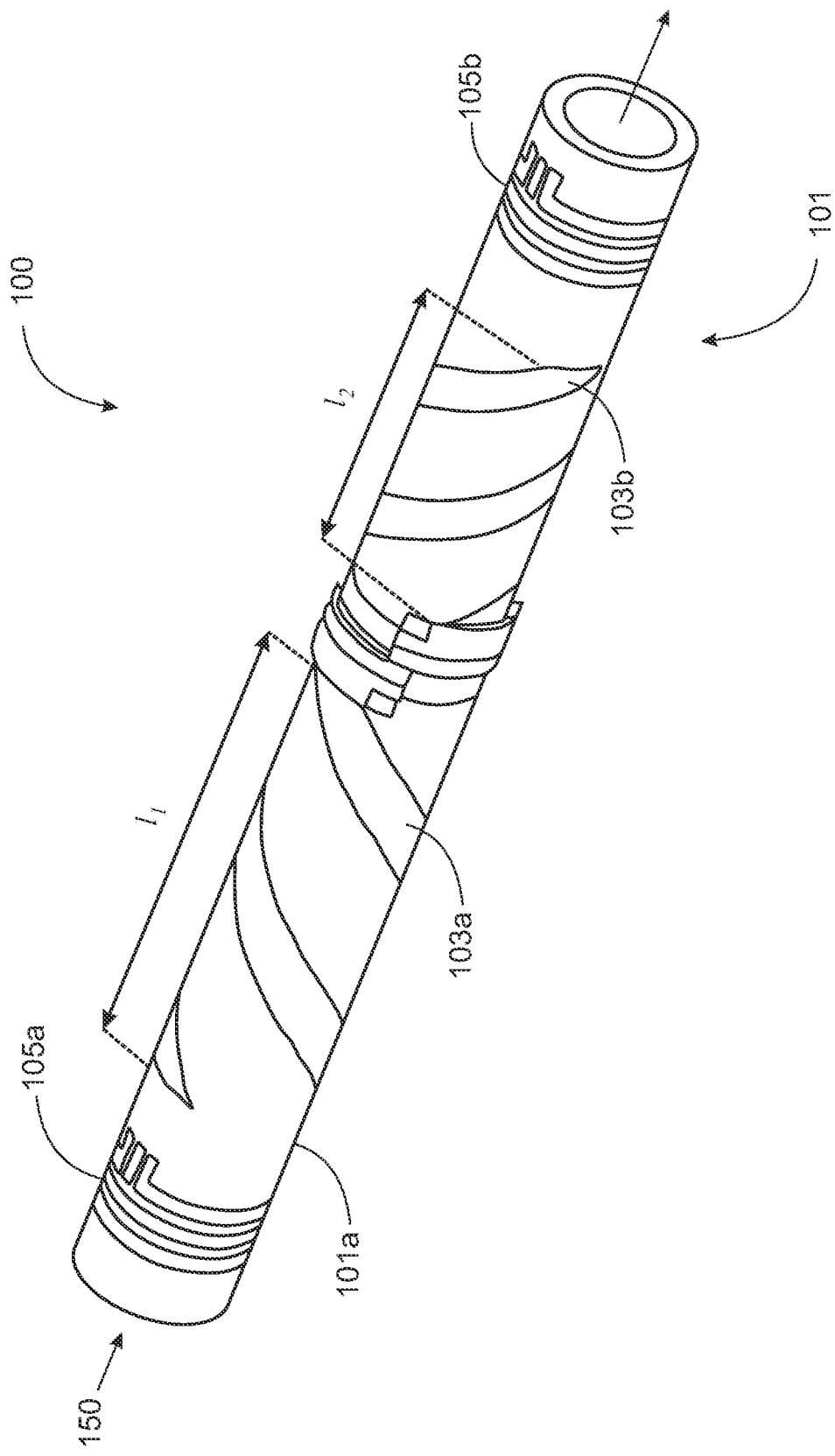
FIG. 1A is a schematic diagram of an example apparatus for multiphase flow measurement in which a multiphase fluid flows through the apparatus.

FIG. 1A is a schematic diagram of an example apparatus 100 for multiphase flow measurement in which a multiphase fluid 150 flows through the apparatus 100. The multiphase fluid 150 is a fluid that includes multiple phases of matter. For example, the multiphase fluid 150 includes a liquid phase (such as oil) and a gas phase. For example, the multiphase fluid 150 includes multiple liquid phases (such as an aqueous fluid and oil). For example, the multiphase fluid 150 includes multiple liquid phases and a gas phase. The apparatus 100 includes a tubular 101 that includes a wall 101a that defines an inner bore configured to flow the multiphase fluid 150. The apparatus 100 includes a first microwave resonator 103a, a second microwave resonator 103b, and a coplanar waveguide resonator 105a. In some implementations, the first and second microwave resonators 103a, 103b are printed on the wall 101a of the tubular 101. In some implementations, the coplanar waveguide resonator 105a is printed on the wall 101a of the tubular 101. In some implementations, the tubular 101 is made of a non-metallic material. For example, the tubular 101 is made of a polymeric material, such as polyether ether ketone (PEEK). For example, the tubular 101 is made of a composite material. In such implementations, the tubular 101 itself does not function as a resonating material and remains unaffected by electric fields generated by other components of the apparatus 100, such as the microwave resonators (103a, 103b) and the coplanar waveguide resonator 105a.

The first microwave resonator 103a and the second microwave resonator 103b can be substantially similar. The first and second microwave resonators 103a, 103b are disposed on an outer circumferential surface of the wall 101a of the tubular 101. For example, the first and second microwave resonators 103a, 103b are spiral T-resonators. The first microwave resonator 103a has a first helical shape with a first longitudinal length ($l_1$). The second microwave resonator 103b has a second helical shape with a second longitudinal length ($l_2$) that is different from the first longitudinal length ($l_1$). For example, the second longitudinal length ($l_2$) is shorter or longer than the first longitudinal length ($l_1$). In some implementations, each of the first and second longitudinal lengths ($l_1$, $l_2$) are in a range of from about 4 inches (in) to about 10 in.

Because the first and second microwave resonators 103a, 103b have different longitudinal lengths, they have different resonant frequencies. The first microwave resonator 103a is configured to generate a first electric field that rotates in the inner bore of the tubular 101 along the first helical shape of the first microwave resonator 103a. The first electric field has a frequency in the microwave spectrum. In some implementations, the first electric field has a frequency in a range of from 50 megahertz (MHz) to 300 gigahertz (GHz), from 50 MHz to 500 MHz, or from 300 MHz to 500 MHz. The second microwave resonator 103b is configured to generate a second electric field that rotates in the inner bore of the tubular 101 along the second helical shape of the second microwave resonator 103b. The second electric field has a frequency in the microwave spectrum. In some implementations, the first electric field has a frequency in a range of from 50 MHz to 300 gigahertz GHz, from 50 MHz to 500 MHz, or from 300 MHz to 500 MHz. The first and second microwave resonators 103a, 103b are mutually orthogonal to each other. Therefore, the first and second electric fields generated by the first and second microwave resonators 103a, 103b, respectively, are also mutually orthogonal to each other.

The first and second microwave resonators 103a, 103b are cooperatively configured to measure a salinity of the multiphase fluid 150 flowing through the inner bore of the tubular 101. For example, the first and second microwave resonators 103a, 103b generate the first and second electric fields, respectively, which excite molecules in the multiphase fluid 150 at different frequencies, and the slope of a measured dielectric loss can be determined to measure the salinity of the multiphase fluid 150. In some implementations, the first and second microwave resonators 103a, 103b are cooperatively configured to measure a flow rate (for example, volumetric flow rate or mass flow rate) of the multiphase fluid 150 flowing through the inner bore of the tubular 101. In some implementations, the first and second microwave resonators 103a, 103b are cooperatively configured to measure phase fractions of the different phases (for example, oil phase, aqueous phase, and vapor phase) of the multiphase fluid 150 flowing through the inner bore of the tubular 101. In some implementations, the first electric field generated by the first microwave resonator 103a makes at least a 360 degree rotation (one full revolution) in the inner bore along the first helical shape of the first microwave resonator 103a. In some implementations, the second electric field generated by the second microwave resonator 103b makes at least a 360 degree rotation (one full revolution) in the inner bore along the second helical shape of the second microwave resonator 103b.

In some implementations, the longitudinal lengths ($l_1$, $l_2$) of the first and second microwave resonators 103a, 103b allow them to act as low-pass filters. As a result, quick changes (for example, a change with a timescale on the order of 5 to 10 milliseconds (ms)) in the multiphase fluid 150 (for example, salinity or velocity) can be averaged over a time period (for example, in a range of from about 25 ms to about 50 ms). For example, a multiphase fluid can have turbulent flow, and its geometric distribution within a cross-section of a tubular may quickly change. Such fluctuating variations in the multiphase fluid can be averaged over a length of the apparatus 100 (for example, the length of the first and second microwave resonators 103a, 103b), and turbulence appearance in the readout circuitry can be slower.

The apparatus 100 includes a ground conductor, such as a ring-shaped ground conductor. In some implementations, each of the microwave resonators 103a, 103b is paired with a respective helical ground conductor. Mutual rotation of the resonators 103a, 103b and helical ground conductors can facilitate rotation of the electric fields.

The coplanar waveguide resonator 105a is disposed on the outer circumferential surface of the wall 101a. The coplanar waveguide resonator 105a can be, for example, a ring resonator. The coplanar waveguide resonator 105a is configured to generate a third electric field to measure a flow rate of the multiphase fluid 150, for example, flowing through the inner bore of the tubular 101. The third electric field has a frequency in the microwave spectrum. In some implementations, the third electric field has a frequency in a range of from about 250 MHz to about 1000 MHz. In some implementations, the third electric field generated by the coplanar waveguide resonator 105a has a shallower reach (that is, electric field penetration) into a substrate in comparison to the first and second electric fields generated by the first and second microwave resonators 103a, 103b, respectively. In some implementations, the coplanar waveguide resonator 105a is configured to measure the salinity of the multiphase fluid 150. For example, the coplanar waveguide resonator 105a can be configured to measure the salinity of the multiphase fluid 150 flowing in an annular flow regime, in which liquid forms a continuous film along an inner circumferential surface of the wall 101a of the tubular 101. Varying wall thicknesses of the wall 101a of the tubular 101 can be accommodated by adjusting a gap between signal and ground conductors of the coplanar waveguide resonator 105a, such that the third electric field generated by the coplanar waveguide resonator 105a has sufficient reach, for example, to detect the liquid film formed on the inner circumferential surface of the wall 101a of the tubular 101 and remain unaffected by gas flowing further away from the wall 101a and closer to the center of the tubular 101. In some implementations, the coplanar waveguide resonator 105a is made of the same material as the first and second microwave resonators 103a, 103b.

In some implementations, the apparatus 100 includes a second coplanar waveguide resonator 105b. The second coplanar waveguide resonator 105b can be, for example, a ring resonator. Similar to the first waveguide resonator 105a, the second coplanar waveguide resonator 105b can be disposed on the outer circumferential surface of the wall 101a. The second coplanar waveguide resonator 105b can be configured to generate a fourth electric field similar to the third electric field generated by the coplanar waveguide resonator 105a. The fourth electric field can have a frequency in the microwave spectrum. In some implementations, the fourth electric field has a frequency in a range of from about 250 MHz to about 1000 MHz. In some implementations, the fourth electric field generated by the second coplanar waveguide resonator 105b has a shallower reach (that is, electric field penetration) into a substrate in comparison to the first and second electric fields generated by the first and second microwave resonators 103a, 103b, respectively. In some implementations, the first and second coplanar waveguide resonators 105a, 105b are cooperatively configured to measure the flow rate and a dielectric loss of the multiphase fluid 150 flowing through the inner bore of the tubular 101. The dielectric loss of the multiphase fluid 150 measured by the first and second coplanar waveguide resonators 105a, 105b can be correlated to the salinity of the multiphase fluid 150. In some implementations, the first and second microwave resonators 103a, 103b are disposed on the outer circumferential surface of the wall 101a between the first and second coplanar waveguide resonators 105a, 105b. In some implementations, the apparatus 100 includes additional coplanar waveguide resonators (similar to 105a, 105b) that can be used to measure flow rate in flow regimes other than the annular flow regime (for example, turbulent regime). In some implementations, the second coplanar waveguide resonator 105b is made of the same material as the first and second microwave resonators 103a, 103b. The coplanar waveguide resonators 105a, 105b and the microwave resonators 103a, 103b can all be types of microwave resonators that function differently based on shape and size.

Figure 1B:
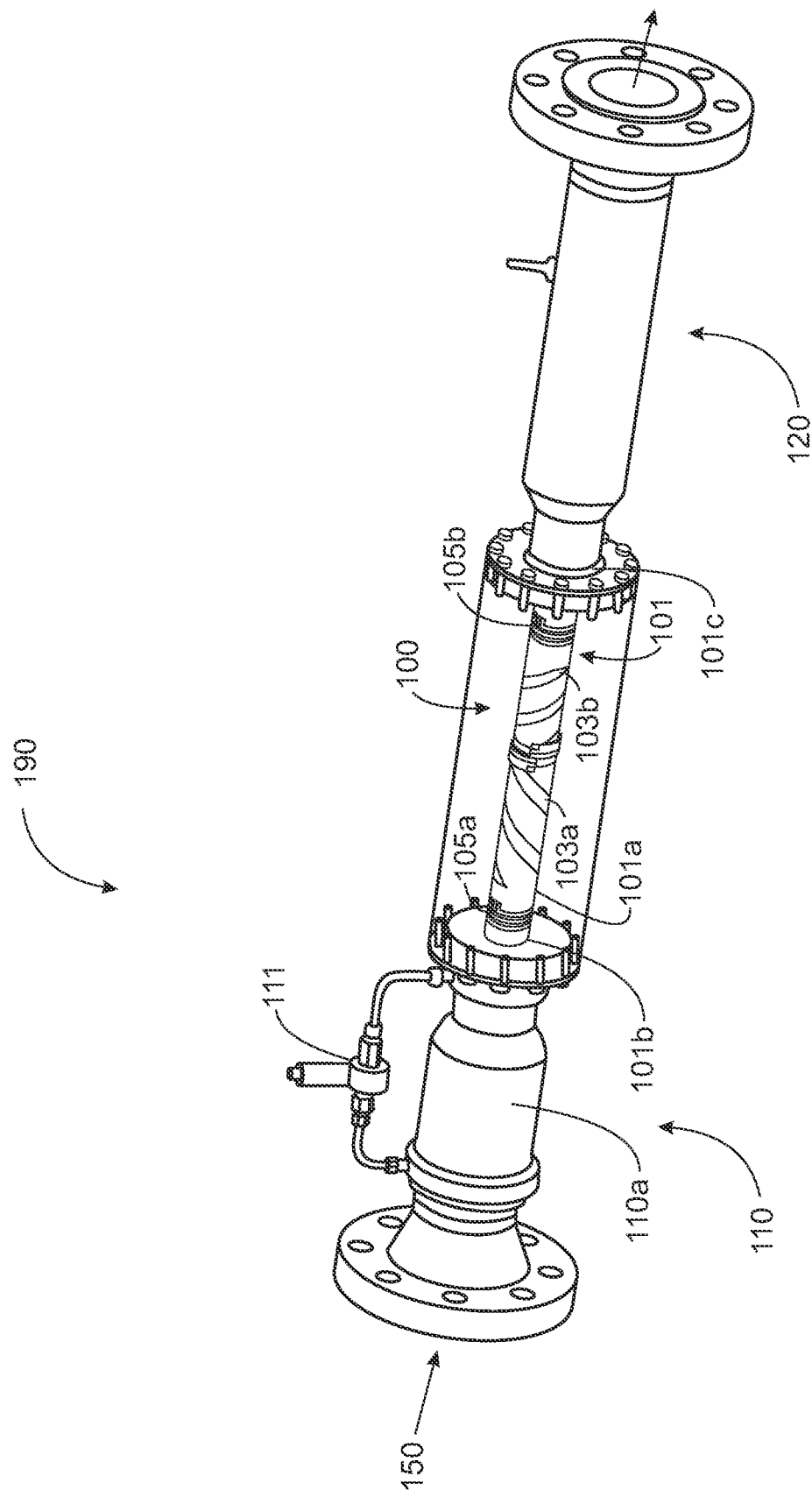
FIG. 1B is a schematic diagram of an example apparatus for multiphase flow measurement in which a multiphase fluid flows through the apparatus.

FIG. 1B is a schematic diagram of an apparatus 190 for multiphase flow measurement in which a multiphase fluid 150 flows through the apparatus 190. The apparatus 190 can be substantially similar to the apparatus 100. For example, apparatus 190 can include component(s) of apparatus 100. In some implementations, the apparatus 190 includes a Venturi tube 110. In some implementations, the Venturi tube 110 includes a convergent section 110a having a cross-sectional area that is smaller than a cross-sectional area of the inner bore of the tubing 101. In some implementations, an outlet 110b of the Venturi tube 110 is coupled to an inlet 101b of the tubular 101. In some implementations, the apparatus 190 includes a differential pressure sensor 111 fluidically coupled to the Venturi tube 110 upstream and downstream of the convergent section 110a. The differential pressure sensor 111 is configured to measure a pressure drop of the multiphase fluid 150 through the convergent section 110a. In some implementations, the coplanar waveguide resonator 105a, the second coplanar waveguide resonator 105b, and the differential pressure sensor 111 are cooperatively configured to measure the flow rate of the multiphase fluid 150, for example, flowing through the inner bore of the tubular 101. For example, the flow rate determined by the first and second coplanar waveguide resonators 105a, 105b can be correlated to the pressure drop measured by the differential pressure sensor 111 to more accurately calculate the flow rate of the multiphase fluid 150.

In some implementations, the apparatus 190 includes a temperature sensor 120. In some implementations, the temperature sensor 120 is coupled to an outlet 101c of the tubular 101. The temperature sensor 120 is configured to measure a temperature of the multiphase fluid 150, for example, flowing through the inner bore of the tubular 101. In some implementations, the coplanar waveguide resonator 105a, the second coplanar waveguide resonator 105b, the differential pressure sensor 111, and the temperature sensor 120 are cooperatively configured to measure the flow rate and the salinity of the multiphase fluid 150, for example, flowing through the inner bore of the tubular 101. In some implementations, the temperature sensor 120 is an inline temperature sensor.

Figure 2:
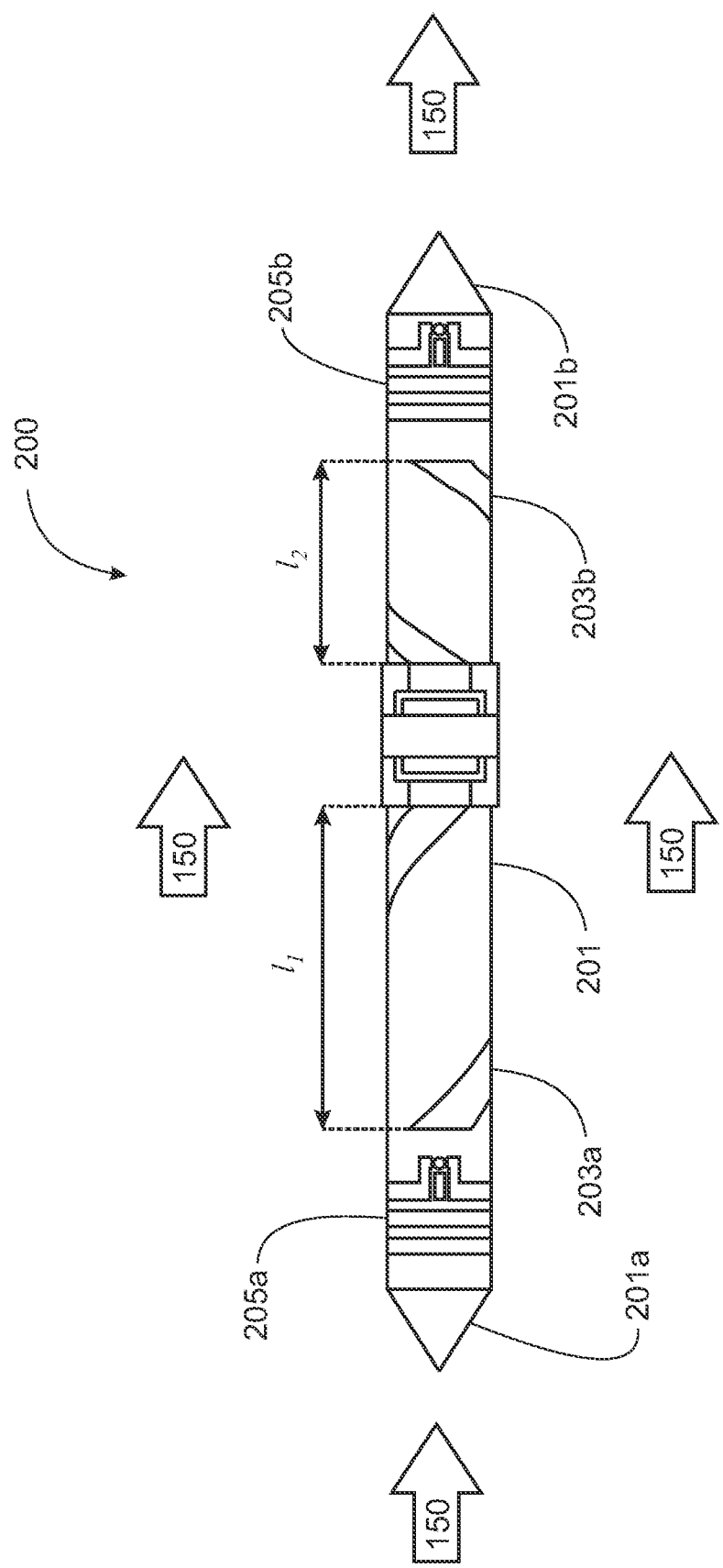
FIG. 2 is a schematic diagram of an example apparatus for multiphase flow measurement in which a multiphase fluid flows around an exterior of the apparatus.

FIG. 2 is a schematic diagram of an example apparatus 200 for multiphase flow measurement in which a multiphase fluid 150 flows around an exterior of the apparatus 200. The apparatus 200 is configured to be disposed within a pipe that flows a multiphase fluid (such as the multiphase fluid 150). The multiphase fluid 150 flows across an exterior of the apparatus 200. The apparatus 200 can be substantially similar to the apparatus 100. For example, apparatus 200 can include component(s) of apparatus 100.

The apparatus 200 includes a tubular 201. The apparatus 200 includes a first conical end 201a and a second conical end 201b. The first and second conical ends 201a, 201b are coupled to the tubular 201 at opposite ends of the tubular 201. The apparatus 200 includes a first microwave resonator 203a, a second microwave resonator 203b, and a coplanar waveguide resonator 205a. In some implementations, the first and second microwave resonators 203a, 203b are printed on an exterior of the tubular 201. In some implementations, the coplanar waveguide resonator 205a is printed on the exterior of the tubular 201. In some implementations, the tubular 201 is made of a non-metallic material. For example, the tubular 201 is made of a polymeric material, such as polyether ether ketone (PEEK). For example, the tubular 201 is made of a composite material. In such implementations, the tubular 201 itself does not function as a resonating material and remains unaffected by electric fields generated by other components of the apparatus 200, such as the microwave resonators (203a, 203b) and the coplanar waveguide resonator 205a.

The first and second microwave resonators 203a, 203b can be substantially similar to the first and second microwave resonators 103a, 103b. The first microwave resonator 203a and the second microwave resonator 203b can be substantially similar. In some implementations, the first and second microwave resonators 203a, 203b are disposed on an outer circumferential surface of the tubular 201. The first microwave resonator 203a has a first helical shape with a first longitudinal length ($l_1$). The second microwave resonator 203b has a second helical shape with a second longitudinal length ($l_2$) that is different from the first longitudinal length ($l_1$). For example, the second longitudinal length ($l_2$) is shorter or longer than the first longitudinal length ($l_1$). Because the first and second microwave resonators 203a, 203b have different longitudinal lengths, they have different resonant frequencies. The first microwave resonator 203a is configured to generate a first electric field that rotates around the exterior of the tubular 201 along the first helical shape of the first microwave resonator 203a. The first electric field has a frequency in the microwave spectrum. The second microwave resonator 203b is configured to generate a second electric field that rotates around the exterior of the tubular 201 along the second helical shape of the second microwave resonator 203b. The second electric field has a frequency in the microwave spectrum. The first and second microwave resonators 203a, 203b are mutually orthogonal to each other. Therefore, the first and second electric fields generated by the first and second microwave resonators 203a, 203b, respectively, are also mutually orthogonal to each other.

The first and second microwave resonators 203a, 203b are cooperatively configured to measure a salinity of the multiphase fluid 150 flowing across the exterior of the tubular 201. For example, the first and second microwave resonators 203a, 203b generate the first and second electric fields, respectively, which excite molecules in the multiphase fluid 150 at different frequencies, and the slope of a measured dielectric loss can be determined to measure the salinity of the multiphase fluid 150. In some implementations, the first and second microwave resonators 203a, 203b are cooperatively configured to measure a flow rate (for example, volumetric flow rate or mass flow rate) of the multiphase fluid 150 flowing across the exterior of the tubular 201. In some implementations, the first and second microwave resonators 203a, 203b are cooperatively configured to measure phase fractions of the different phases (for example, oil phase, aqueous phase, and vapor phase) of the multiphase fluid 150 flowing across the exterior of the tubular 101. In some implementations, the first electric field generated by the first microwave resonator 203a makes at least a 360 degree rotation (one full revolution) around the exterior of the tubular 201 along the first helical shape of the first microwave resonator 203a. In some implementations, the second electric field generated by the second microwave resonator 203b makes at least a 360 degree rotation (one full revolution) around the exterior of the tubular 201 along the second helical shape of the second microwave resonator 203b.

The coplanar waveguide resonator 205a can be substantially similar to the coplanar waveguide resonator 105a. The coplanar waveguide resonator 205a is disposed on the outer circumferential surface of the tubular 201. The coplanar waveguide resonator 205a is configured to generate a third electric field to measure a flow rate of the multiphase fluid 150, for example, flowing across the exterior of the tubular 201. The third electric field has a frequency in the microwave spectrum. In some implementations, the coplanar waveguide resonator 205a is configured to measure the salinity of the multiphase fluid 150.

In some implementations, the apparatus 200 includes a second coplanar waveguide resonator 205b. Similar to the first waveguide resonator 205a, the second coplanar waveguide resonator 205b can be disposed on the outer circumferential surface of the tubular 201. The second coplanar waveguide resonator 205b can be configured to generate a fourth electric field similar to the third electric field generated by the coplanar waveguide resonator 205a. The fourth electric field can have a frequency in the microwave spectrum. In some implementations, the first and second coplanar waveguide resonators 205a, 205b are cooperatively configured to measure the flow rate and a dielectric loss of the multiphase fluid 150 flowing across the exterior of the tubular 201. In some implementations, the first and second microwave resonators 203a, 203b are disposed on the outer circumferential surface of the tubular 201 between the first and second coplanar waveguide resonators 205a, 205b. In some implementations, the apparatus 200 includes additional coplanar waveguide resonators (similar to 205a, 205b) that can be used to measure flow rate in flow regimes other than the annular flow regime (for example, turbulent regime).

Figure 3:
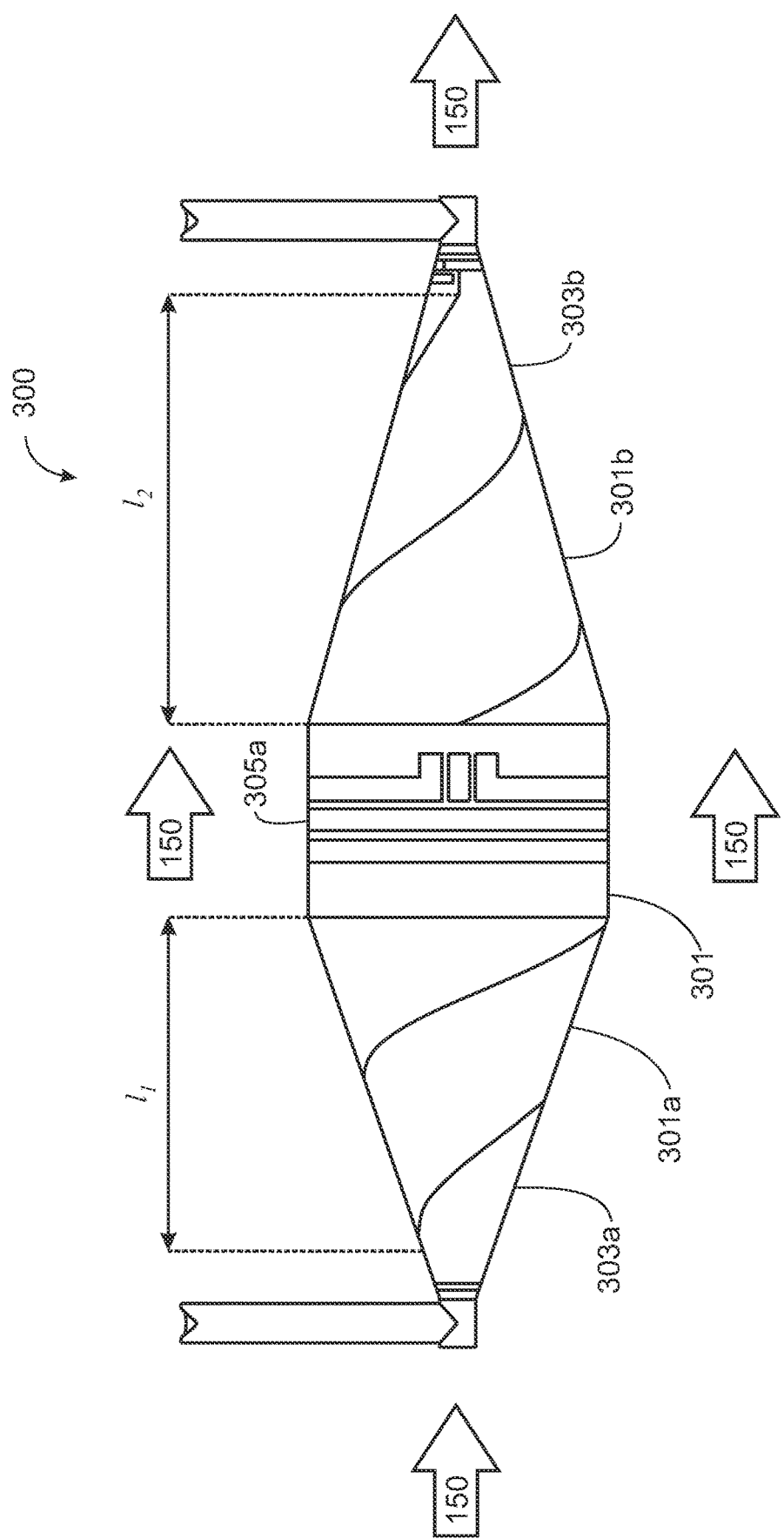
FIG. 3 is a schematic diagram of an example apparatus for multiphase flow measurement in which a multiphase fluid flows around an exterior of the apparatus.

FIG. 3 is a schematic diagram of an example apparatus 300 for multiphase flow measurement in which a multiphase fluid 150 flows around an exterior of the apparatus 300. The apparatus 300 is configured to be disposed within a pipe that flows a multiphase fluid (such as the multiphase fluid 150). The multiphase fluid 150 flows across an exterior of the apparatus 300. The apparatus 300 can be substantially similar to the apparatus 100 and/or apparatus 200. For example, apparatus 300 can include component(s) of apparatus 100 and/or apparatus 200. In some cases, apparatus 300 is the most compact in size in comparison to apparatuses 100 and 200.

The apparatus 300 includes a tubular 301. The apparatus 300 includes a first conical end 301a and a second conical end 301b. The first and second conical ends 301a, 301b are coupled to the tubular 301 at opposite ends of the tubular 301. The apparatus 300 includes a first microwave resonator 303a, a second microwave resonator 303b, and a coplanar waveguide resonator 305a. In some implementations, the first microwave resonator 303a is printed on an exterior of the first conical end 301a. In some implementations, the second microwave resonator 303b is printed on an exterior of the second conical end 301b. In some implementations, the coplanar waveguide resonator 305a is printed on the exterior of the tubular 301. In some implementations, the tubular 301 is made of a non-metallic material. For example, the tubular 301 is made of a polymeric material, such as polyether ether ketone (PEEK). For example, the tubular 301 is made of a composite material. In such implementations, the tubular 301 itself does not function as a resonating material and remains unaffected by electric fields generated by other components of the apparatus 300, such as the microwave resonators (303a, 303b) and the coplanar waveguide resonator 305a.

Electrical components can be housed within the apparatus 300. For example, the first conical end 301a, the second conical end 301b, and the tubular 301 form a housing within which electrical components can be disposed and protected from exposure to the multiphase fluid 150. The apparatus 300 can be supported, for example, by pipes coupled at opposite ends of the apparatus 300. The pipes can provide structural support for the apparatus 300 and can also route wiring to electrical components housed within the apparatus 300.

The first and second microwave resonators 303a, 303b can be substantially similar to the first and second microwave resonators 103a, 103b. The first microwave resonator 303a and the second microwave resonator 303b can be substantially similar. In some implementations, the first microwave resonator 303a is disposed on an exterior of the first conical end 301a. In some implementations, the first microwave resonator 303a wraps around the exterior of the first conical end 301a. The first microwave resonator 303a has a first helical shape with a first longitudinal length ($l_1$). The second microwave resonator 303b has a second helical shape with a second longitudinal length ($l_2$) that is different from the first longitudinal length ($l_1$). For example, the second longitudinal length ($l_2$) is shorter or longer than the first longitudinal length ($l_1$). Because the first and second microwave resonators 303a, 303b have different longitudinal lengths, they have different resonant frequencies. The first microwave resonator 303a is configured to generate a first electric field that rotates around the exterior of the first conical end 301a along the first helical shape of the first microwave resonator 303a. The first electric field has a frequency in the microwave spectrum. The second microwave resonator 303b is configured to generate a second electric field that rotates around the exterior of the second conical end 301b along the second helical shape of the second microwave resonator 303b. The second electric field has a frequency in the microwave spectrum. The first and second microwave resonators 303a, 303b are mutually orthogonal to each other. Therefore, the first and second electric fields generated by the first and second microwave resonators 303a, 303b, respectively, are also mutually orthogonal to each other.

The first and second microwave resonators 303a, 303b are cooperatively configured to measure a salinity of the multiphase fluid 150 flowing across the exterior of the apparatus 300 (for example, the exterior of the first and second conical ends 301a, 301b). For example, the first and second microwave resonators 303a, 303b generate the first and second electric fields, respectively, which excite molecules in the multiphase fluid 150 at different frequencies, and the slope of a measured dielectric loss can be determined to measure the salinity of the multiphase fluid 150. In some implementations, the first and second microwave resonators 303a, 2303b are cooperatively configured to measure a flow rate (for example, volumetric flow rate or mass flow rate) of the multiphase fluid 150 flowing across the exterior of the apparatus 300. In some implementations, the first and second microwave resonators 303a, 303b are cooperatively configured to measure phase fractions of the different phases (for example, oil phase, aqueous phase, and vapor phase) of the multiphase fluid 150 flowing across the exterior of the apparatus 300. In some implementations, the first electric field generated by the first microwave resonator 303a makes at least a 360 degree rotation (one full revolution) around the exterior of the first conical end 301a along the first helical shape of the first microwave resonator 303a. In some implementations, the second electric field generated by the second microwave resonator 203b makes at least a 360 degree rotation (one full revolution) around the exterior of the second conical end 301b along the second helical shape of the second microwave resonator 303b.

The coplanar waveguide resonator 305a can be substantially similar to the coplanar waveguide resonator 105a. The coplanar waveguide resonator 305a is disposed on the outer circumferential surface of the tubular 301. The coplanar waveguide resonator 305a is configured to generate a third electric field to measure a flow rate of the multiphase fluid 150, for example, flowing across the exterior of the apparatus 300 (for example, the exterior of the tubular 301). The third electric field has a frequency in the microwave spectrum. In some implementations, the coplanar waveguide resonator 305a is configured to measure the salinity of the multiphase fluid 150.

Figure 4:
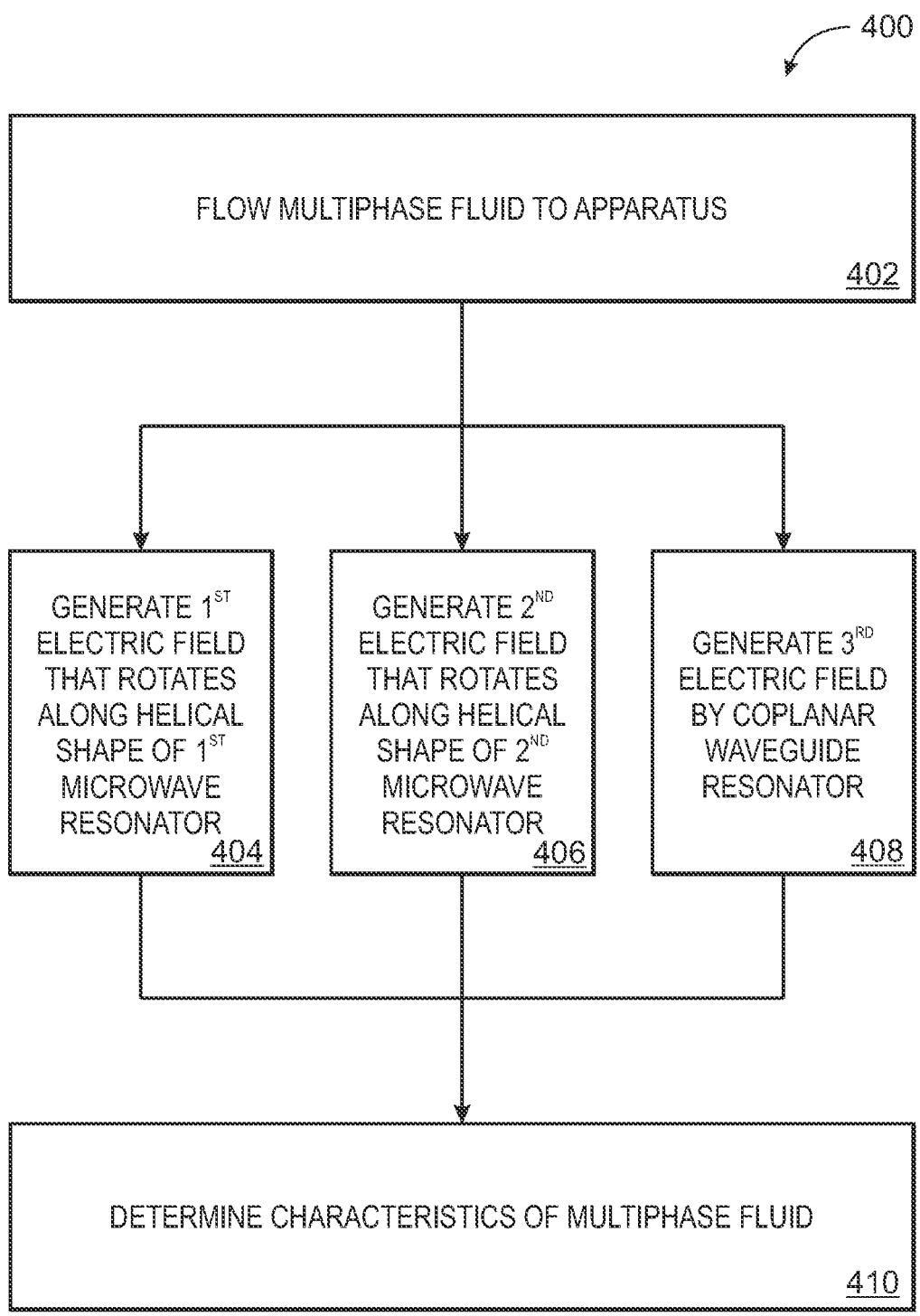
FIG. 4 is a flow chart of an example method for multiphase flow measurement.

FIG. 4 is a flow chart of an example method 400 for multiphase flow measurement. Any of the apparatuses 100, 200, or 300 can be used to implement the method 400. For clarity, steps 402, 404, 406, 408, and 410 are described in relation to apparatus 100 even though apparatuses 200 and 300 can be used to implement these steps as well. At step 402, a multiphase fluid (such as the multiphase fluid 150) is flowed to contact the apparatus 100. In some implementations, the multiphase fluid 150 is flowed through the inner bore of the tubular 101.

At step 404, a first electric field is generated by the first microwave resonator 103a. The first electric field generated by the first microwave resonator 103a at step 404 rotates along the first helical shape of the first microwave resonator 103a. In some implementations, the first electric field generated by the first microwave resonator 103a at step 404 makes at least a 360 degree rotation along the first helical shape of the first microwave resonator 103a. The first electric field generated by the first microwave resonator 103a at step 404 can have frequency in the microwave spectrum. In some implementations, the first microwave resonator 103a is disposed on the exterior of the tubular 101. In some implementations, the first electric field generated by the first microwave resonator 103a at step 404 rotates in the inner bore of the tubular 101.

At step 406, a second electric field is generated by the second microwave resonator 103b. The second electric field generated by the second microwave resonator 103b at step 406 rotates along the second helical shape of the second microwave resonator 103b. In some implementations, the second electric field generated by the second microwave resonator 103b at step 406 makes at least a 360 degree rotation along the second helical shape of the second microwave resonator 103b. The second electric field generated by the second microwave resonator 103b at step 404 can have a frequency in the microwave spectrum. In some implementations, the second microwave resonator 103b is disposed on the exterior of the tubular 101. In some implementations, the second electric field generated by the second microwave resonator 103b at step 406 rotates in the inner bore of the tubular 101.

At step 408, a third electric field is generated by the coplanar waveguide resonator 105a. The third electric field generated by the coplanar waveguide resonator 105a at step 408 can have a frequency in the microwave spectrum. In some implementations, a fourth electric field is generated by the second coplanar waveguide resonator 105b. The fourth electric field generated by the second coplanar waveguide resonator 105b can have a frequency in the microwave spectrum.

At step 410, a fluid characteristic of the multiphase fluid 150 is determined in response to generating the first, second, and third electric fields at steps 404, 406, and 408, respectively. The fluid characteristic includes at least one of flow rate, salinity, or phase fraction (such as water cut or gas volume fraction). In some implementations, a dielectric loss of the multiphase fluid 150 is determined in response to generating the third and fourth electric fields.

Examples

FIG. 5A is a plot 500 showing the effect of salinity on the dielectric constant of brines. The brines had salinity levels ranging from 5,000 parts per million (ppm) to 200,000 ppm. The dielectric constant (also referred as relative permittivity) of the brines were measured over a range of frequencies. As shown in FIG. 5A, dielectric constant (er') dispersion increases as salinity increases, and the dispersion of the saltiest brine (200,000 ppm) was greatest. Therefore, dielectric constant dispersion can be correlated to salinity level. The apparatuses 100, 200, and 300 can be used to measure a dielectric constant dispersion of the multiphase fluid 150, which can then be used to determine the salinity of the multiphase fluid 150. The slope of the dielectric constant (er') curve also varies with respect to frequency. By using resonators working at different frequencies, the salinity of the multiphase fluid 150 can be measured without needing to take a sample of the fluid 150 and analyzing the sample, for example, in a lab. Further, by using resonators working at different frequencies, the apparatus can auto-calibrate and therefore eliminate the need for frequent recalibrations. In some cases, the dielectric constant measurements at different frequencies can be used to estimate other unknown characteristics, such as water cut ratio or gas volume fraction of the multiphase fluid 150.

Figure 5B:
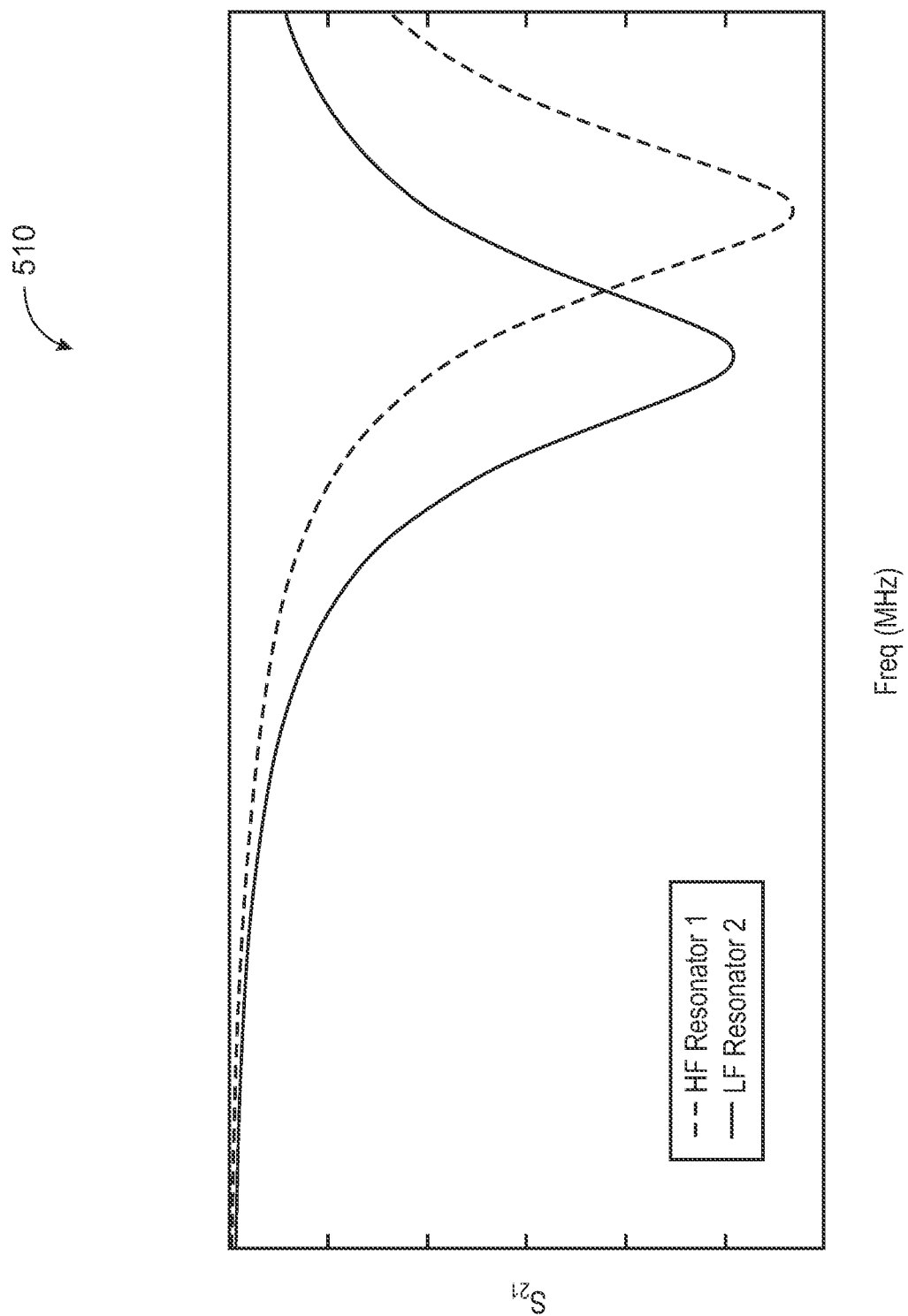
FIG. 5B is a plot showing response signals of two resonators having different frequencies to an oil/water medium.

FIG. 5B is a plot 510 showing response signals of two resonators having different frequencies to an oil/water medium. Resonator 1 was labeled high frequency (HF), and Resonator 2 was labeled low frequency (LF). The HF Resonator 1 measured dielectric properties of the multiphase fluid at a higher frequency in comparison to the LF Resonator 2. $S_{21}$ (y-axis) is a measure of the signal coming out of the output port relative to the stimulus entering the input port of the respective resonator. The difference in the two curves (for example, the separation or difference between the resonant frequencies) can define a slope and can be characteristic of a certain salinity level (for example, shown in FIG. 5C). Therefore, the difference in the two curves can be correlated to the salinity of the aqueous phase of a multiphase fluid 150, the water cut ratio of the multiphase fluid 150, the gas volume fraction of the multiphase fluid 150, or a combination of these.

Figure 5C:
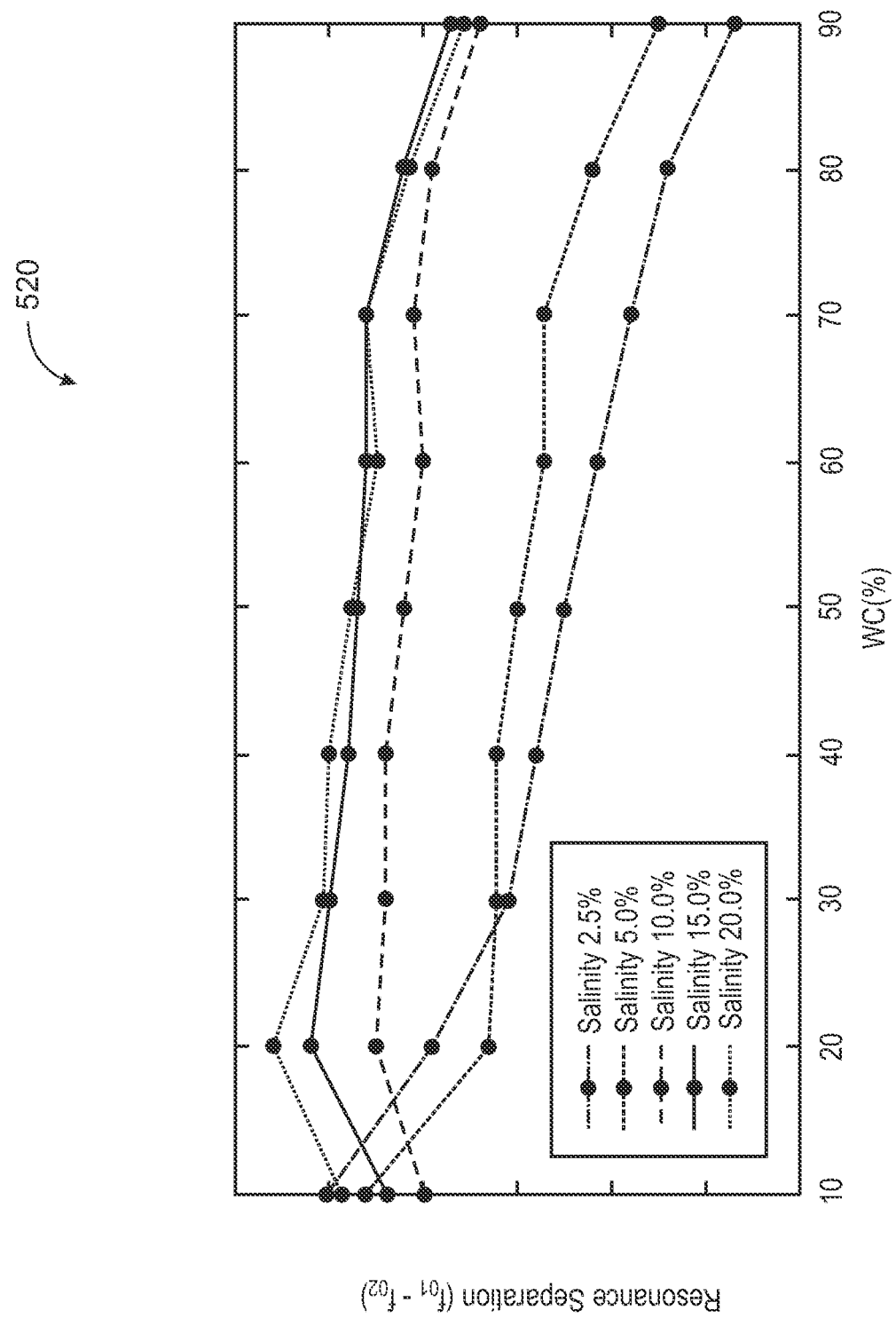
FIG. 5C is a plot showing the effect of salinity on resonance separation in brines.

FIG. 5C is a plot 520 showing the effect of salinity on resonance separation in brines. WC (%) is water cut percentage. As shown in FIG. 5C, resonance separation increases as salinity increases, which is consistent with the results shown in FIG. 5A (dispersion of dielectric constant). Therefore, resonance separation (similar to dielectric constant dispersion) can be correlated to salinity level. The apparatuses 100, 200, and 300 can be used to measure a resonance separation of the multiphase fluid 150, which can then be used to determine the salinity of the multiphase fluid 150. The resonance separation can also be correlated to the water cut ratio of the multiphase fluid 150 and/or the gas volume fraction of the multiphase fluid 150.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A multiphase flow measurement apparatus comprising:
a tubular comprising a wall formed to define an inner bore configured to flow a multiphase fluid;
a first microwave resonator disposed on an outer circumferential surface of the wall, the first microwave resonator having a first helical shape with a first longitudinal length, the first microwave resonator configured to generate a first electric field that rotates in the inner bore along the first helical shape of the first microwave resonator;
a second microwave resonator disposed on the outer circumferential surface of the wall, the second microwave resonator having a second helical shape with a second longitudinal length different from the first longitudinal length of the first microwave resonator, the second microwave resonator configured to generate a second electric field that rotates in the inner bore along the second helical shape of the second microwave resonator, the first and second microwave resonators oppositely handed with respect to each other and cooperatively configured to measure a salinity of the multiphase fluid flowing through the inner bore; and
a coplanar waveguide resonator disposed on the outer circumferential surface of the wall, the coplanar waveguide resonator configured to generate a third electric field to measure a flow rate of the multiphase fluid flowing through the inner bore.

2. The apparatus of claim 1, wherein:
the coplanar waveguide resonator is a first coplanar waveguide resonator;
the apparatus comprises a second coplanar waveguide resonator disposed on the outer circumferential surface of the wall and configured to generate a fourth electric field; and
the first and second coplanar waveguide resonators are cooperatively configured to measure the flow rate and a dielectric loss of the multiphase fluid flowing through the inner bore.

3. The apparatus of claim 2, wherein the first and second microwave resonators are disposed on the outer circumferential surface of the wall between the first and second coplanar waveguide resonators.

4. The apparatus of claim 2, comprising a Venturi tube comprising a convergent section having a cross-sectional area that is smaller than a cross-sectional area of the inner bore, wherein an outlet of the Venturi tube is coupled to an inlet of the tubular.

5. The apparatus of claim 4, comprising a differential pressure sensor fluidically coupled to the Venturi tube upstream and downstream of the convergent section, the differential pressure sensor configured to measure a pressure drop of the multiphase fluid through the convergent section, wherein the first coplanar waveguide resonator, the second coplanar waveguide resonator, and the differential pressure sensor are cooperatively configured to measure the flow rate of the multiphase fluid flowing through the inner bore.

6. The apparatus of claim 5, comprising a temperature sensor coupled to the tubular, the temperature sensor configured to measure a temperature of the multiphase fluid, wherein the first coplanar waveguide resonator, the second coplanar waveguide resonator, the differential pressure sensor, and the temperature sensor are cooperatively configured to measure the flow rate and the salinity of the multiphase fluid flowing through the inner bore.

7. The apparatus of claim 6, wherein:
the first microwave resonator is configured to generate the first electric field, such that the first electric field makes at least a 360 degree rotation in the inner bore along the first helical shape of the first microwave resonator; and
the second microwave resonator is configured to generate the second electric field, such that the second electric field makes at least a 360 degree rotation in the inner bore along the second helical shape of the second microwave resonator.

8. A multiphase flow measurement apparatus comprising:
a tubular;
a first microwave resonator disposed on an exterior of the apparatus, the first microwave resonator having a first helical shape with a first longitudinal length and configured to generate a first electric field that rotates around the exterior of the apparatus along the first helical shape of the first microwave resonator;
a second microwave resonator disposed on the exterior of the apparatus, the second microwave resonator having a second helical shape with a second longitudinal length different from the first longitudinal length of the first microwave resonator, the second microwave resonator configured to generate a second electric field that rotates around the exterior of the apparatus along the second helical shape of the second microwave resonator, the first and second microwave resonators oppositely handed with respect to each other and cooperatively configured to measure a salinity of a multiphase fluid flowing across the exterior of the apparatus; and
a coplanar waveguide resonator disposed on an exterior of the tubular, wherein the coplanar waveguide resonator is configured to generate a third electric field to measure a flow rate of the multiphase fluid flowing across the exterior of the tubular.

9. The apparatus of claim 8, wherein the first and second microwave resonators are disposed on and wrap around the exterior of the tubular.

10. The apparatus of claim 9, wherein:
the coplanar waveguide resonator is a first coplanar waveguide resonator;
the apparatus comprises a second coplanar waveguide resonator disposed on the exterior of the tubular and configured to generate a fourth electric field; and
the first and second coplanar waveguide resonators are cooperatively configured to measure the flow rate and a dielectric loss of the multiphase fluid flowing across the exterior of the apparatus.

11. The apparatus of claim 10, wherein the first and second microwave resonators are disposed on the exterior of the tubular between the first and second coplanar waveguide resonators.

12. The apparatus of claim 8, comprising a first conical end and a second conical end, wherein the first conical end and the second conical end are coupled to the tubular at opposite ends of the tubular.

13. The apparatus of claim 12, wherein the first microwave resonator is disposed on and wraps around an exterior of the first conical end, and the second microwave resonator is disposed on and wraps around an exterior of the second conical end.

14. The apparatus of claim 13, wherein:

the first microwave resonator is configured to generate the first electric field, such that the first electric field makes at least a 360 degree rotation around the first conical end along the first helical shape of the first microwave resonator; and the second microwave resonator is configured to generate the second electric field, such that the second electric field makes at least a 360 degree rotation around the second conical end along the second helical shape of the second microwave resonator.

15. A method comprising:

flowing a multiphase fluid to contact an apparatus, the apparatus comprising:
- a tubular;
- a first microwave resonator having a first helical shape with a first longitudinal length;
- a second microwave resonator having a second helical shape with a second longitudinal length different from the first longitudinal length of the first microwave resonator, the first and second microwave resonators oppositely handed with respect to each other; and
- a coplanar waveguide resonator disposed on an exterior of the tubular;

generating, by the first microwave resonator, a first electric field that rotates along the first helical shape of the first microwave resonator;

generating, by the second microwave resonator, a second electric field that rotates along the second helical shape of the second microwave resonator;

generating, by the coplanar waveguide resonator, a third electric field; and determining a fluid characteristic of the multiphase fluid in response to generating the first, second, and third electric fields, the fluid characteristic comprising at least one of flow rate, salinity, or phase fraction.

16. The method of claim 15, wherein the first electric field makes at least a 360 degree rotation along the first helical shape of the first microwave resonator, and the second electric field makes at least a 360 degree rotation along the second helical shape of the second microwave resonator.

17. The method of claim 16, wherein:

the apparatus comprises a first conical end and a second conical end;

the first and second conical ends are coupled to the tubular at opposite ends of the tubular;

the first microwave resonator is disposed on and wraps around an exterior of the first conical end; and the second microwave resonator is disposed on and wraps around an exterior of the second conical end.

18. The method of claim 16, wherein:

the first and second microwave resonators are disposed on the exterior of the tubular; and flowing the multiphase fluid to contact the apparatus comprises flowing the multiphase fluid through an inner bore of the tubular.

19. The method of claim 18, comprising:

generating, by a second coplanar waveguide resonator, a fourth electric field; and determining a dielectric loss of the multiphase fluid in response to generating the third and fourth electric fields.

* * * * *

UNITED STATES PATENT AND TRADEMARK OFFICE
CERTIFICATE OF CORRECTION

PATENT NO. : 11,644,351 B2  Page 1 of 1
APPLICATION NO. : 17/206741
DATED : May 9, 2023
INVENTOR(S) : Karimi et al.

It is certified that error appears in the above-identified patent and that said Letters Patent is hereby corrected as shown below:

On the Title Page

Item (73), Assignees paragraph, Line 3, please replace "Thurwal (SA)" with -- Thuwal (SA) --

Signed and Sealed this
Fifteenth Day of August, 2023

Katherine Kelly Vidal
*Director of the United States Patent and Trademark Office*